United States Patent
Nagavalli et al.

(10) Patent No.: US 11,592,810 B2
(45) Date of Patent: Feb. 28, 2023

(54) SYSTEMS AND METHODS FOR INJECTING FAULTS INTO AN AUTONOMY SYSTEM

(71) Applicant: Woven Planet North America, Inc., Los Altos, CA (US)

(72) Inventors: Sasanka Nagavalli, Cupertino, CA (US); Victoria Mary Elizabeth Bellotti, Oakland, CA (US); Sameer Qureshi, Sunnyvale, CA (US); Arturo Sanchez Corral, Mountain View, CA (US); Jennie Arielle Braunstein, San Francisco, CA (US)

(73) Assignee: WOVEN PLANET NORTH AMERICA, INC., Los Altos, CA (US)

( * ) Notice: Subject to any disclaimer, the term of this patent is extended or adjusted under 35 U.S.C. 154(b) by 457 days.

(21) Appl. No.: 16/716,482

(22) Filed: Dec. 16, 2019

(65) Prior Publication Data
US 2021/0181733 A1    Jun. 17, 2021

(51) Int. Cl.
G05B 23/02 (2006.01)
G06F 11/36 (2006.01)
G05D 1/00 (2006.01)

(52) U.S. Cl.
CPC ...... *G05B 23/0256* (2013.01); *G06F 11/3664* (2013.01); *G06F 11/3684* (2013.01);
(Continued)

(58) Field of Classification Search
CPC ...... G05B 23/00–0297; G09B 9/02–52; G05D 1/0088; G07C 5/0808
See application file for complete search history.

(56) References Cited

U.S. PATENT DOCUMENTS

| 10,611,384 | B1 * | 4/2020 | VandenBerg, III ... B60W 40/08 |
| 2017/0139411 | A1 | 5/2017 | Hartung et al. |

(Continued)

FOREIGN PATENT DOCUMENTS

| JP | 2017220041 A | 12/2017 |
| KR | 1020190095909 A | 8/2019 |
| WO | 2019106664 A1 | 6/2019 |

OTHER PUBLICATIONS

Rubaiyat, Ahm, et al., "Experimental Resilience Assessment of Open Source Driving Agent", 2018 IEEE 23rd Pacific Rim International Symposium on Dependable Computing [online], Dec. 4-7, 2018 [retrieved May 2, 2022], Retrieved from Internet: <URL: https://ieeexplore.ieee.org/abstract/document/8639042>, pp. 54-63.*

(Continued)

*Primary Examiner* — Todd Aguilera
(74) *Attorney, Agent, or Firm* — Christopher G. Darrow; Darrow Mustafa PC

(57) ABSTRACT

Examples disclosed herein may involve (i) obtaining data for one or more data variables related to autonomous operation of a vehicle in a test environment being facilitated by the vehicle's autonomy system, (ii) based on the obtained data, evaluating one or more predefined fault rules, each of which comprises (a) one or more predefined criteria related to the one or more data variables and (b) a predefined fault that is to be injected into the autonomy system when the one or more predefined criteria are determined to be satisfied, (iii) based on the evaluation, injecting a predefined fault into the autonomy system, and (iv) capturing data indicative of a response by a response mechanism of the vehicle to the vehicle autonomously operating in accordance with the injected fault.

18 Claims, 10 Drawing Sheets

(52) U.S. Cl.
CPC ...... *G06F 11/3688* (2013.01); *G06F 11/3692* (2013.01); *G05D 1/0088* (2013.01)

(56) References Cited

U.S. PATENT DOCUMENTS

2018/0275657 A1    9/2018  You
2021/0407313 A1\*  12/2021  Urano .................... G09B 9/052

OTHER PUBLICATIONS

International Searching Authority, International Search Report and Written Opinion, PCT/US2020/065258, dated Apr. 7, 2021, 10 pages.

\* cited by examiner

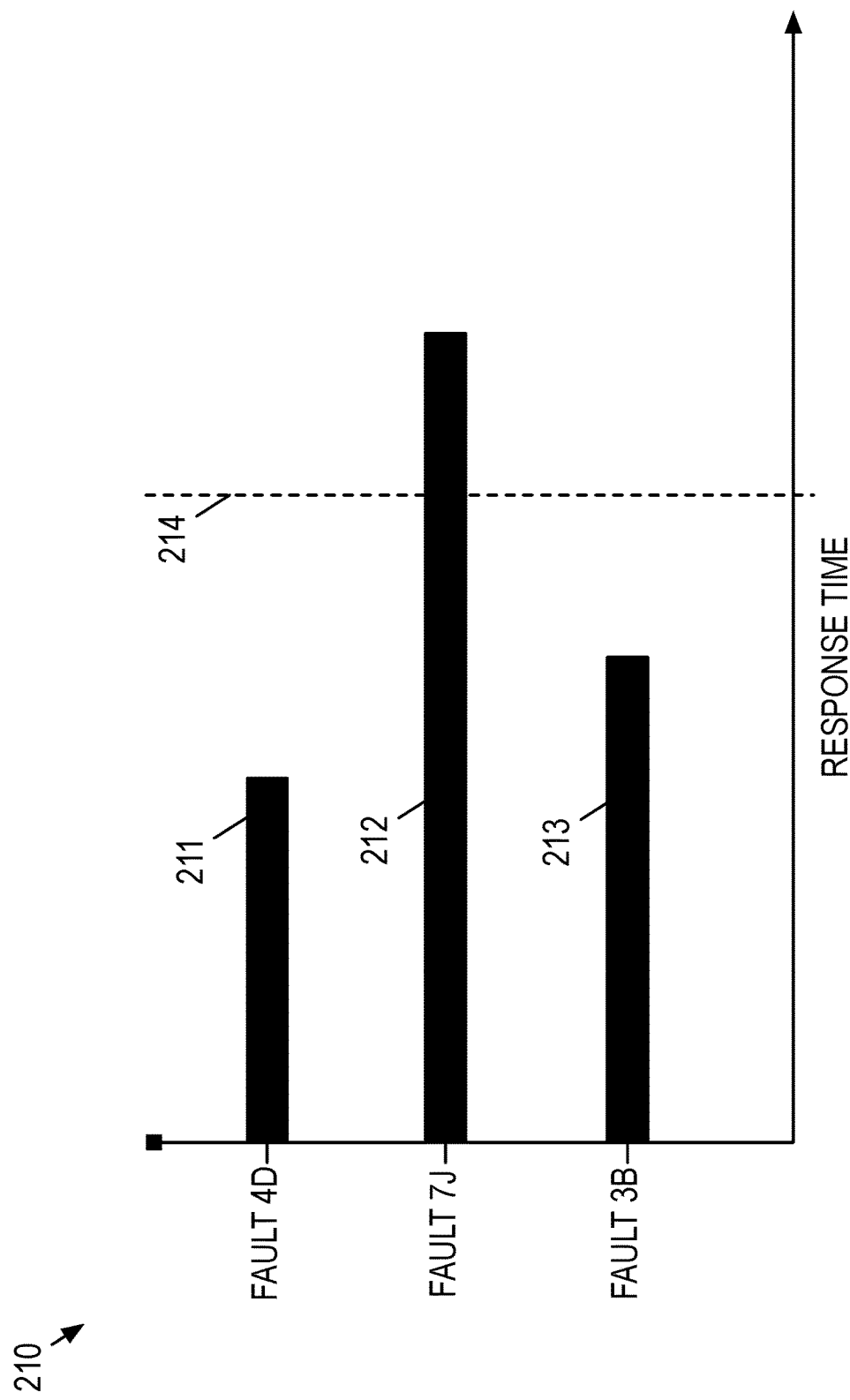

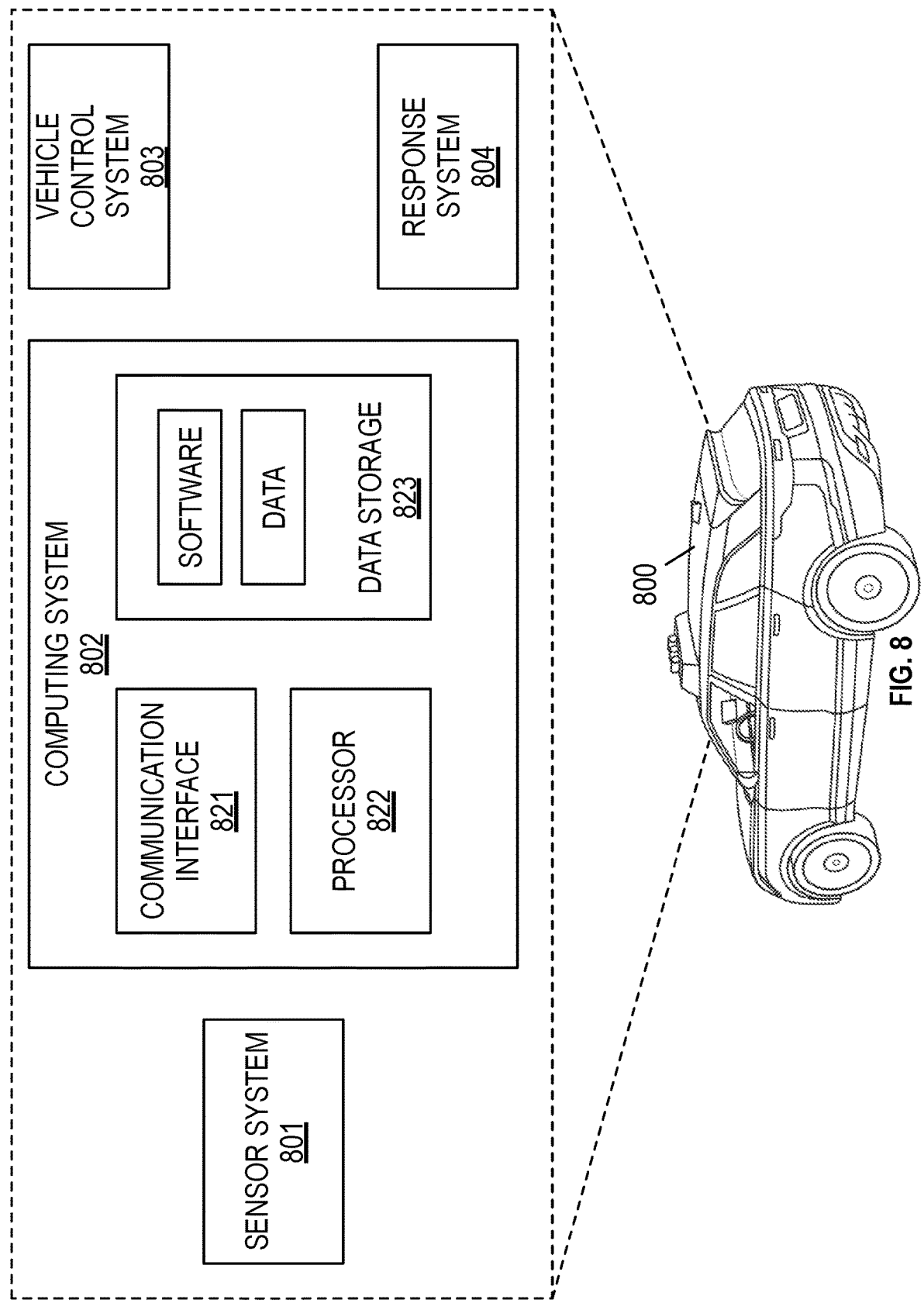

SYSTEMS AND METHODS FOR INJECTING FAULTS INTO AN AUTONOMY SYSTEM

BACKGROUND

Vehicles are increasingly being equipped with technology that enables them to operate in an autonomous mode in which the vehicles are capable of sensing their surrounding environment and safely driving with little or no human input, as appropriate. For instance, vehicles may be equipped with sensors that are configured to capture data representing the vehicle's surrounding environment, an on-board computing system that is configured to perform various functions that facilitate autonomous operation, including but not limited to localization, object detection, and behavior planning, and actuators that are configured to control the physical behavior of the vehicle, among other possibilities. Moreover, such vehicles are typically equipped with safety mechanisms that to help ensure that these operations are performed in a safe manner.

SUMMARY

Various embodiments of the present technology involve a method for automatically injecting faults into an autonomy system that comprises: (i) obtaining data for one or more data variables related to autonomous operation of a vehicle in a test environment being facilitated by an autonomy system of the vehicle, (ii) based on the obtained data, performing an evaluation of a set of one or more predefined fault rules, wherein each of the one or more predefined fault rules comprises (a) a set of one or more predefined criteria related to the one or more data variables and (b) a predefined fault that is to be injected into the autonomy system of the vehicle when the set of one or more predefined criteria are determined to be satisfied, (iii) based on the evaluation, injecting at least one predefined fault into the autonomy system of the vehicle, and (iv) capturing data indicative of a response by a response mechanism of the vehicle to the vehicle autonomously operating in accordance with the at least one injected fault.

In example embodiments, obtaining data for the one or more data variables related to the autonomous operation of the vehicle comprises obtaining, from one or more sensors of the vehicle while the vehicle is operating in the test environment, sensor data related to the autonomous operation of the vehicle within the test environment.

In example embodiments, the set of one or more predefined criteria related to the one or more data variables comprises at least one predefined (i) location-based criterion, (ii) temporal criterion, (iii) ambient-condition criterion, (iv) vehicle-state criterion, or (v) operator criterion.

In example embodiments, the autonomy system comprises one or more of (i) a sensor subsystem, (ii) a perception subsystem, (iii) a prediction subsystem, (iv) a planning subsystem, or (v) a control subsystem.

In example embodiments, the autonomy system further comprises a vehicle interface subsystem, and injecting at least one predefined fault into the autonomy system of the vehicle comprises injecting at least one of (i) a sensor fault into data that is input into the perception subsystem, (ii) a perception fault into data that is input into the prediction subsystem, (iii) a prediction fault into data that is input into the planning subsystem, (iv) a planning fault into data that is input into the control subsystem, or (v) a control fault into data that is input into the vehicle interface.

In example embodiments, the autonomy system of the vehicle uses sensor data to generate derived data that facilitates the autonomous operation of the vehicle in the test environment and injecting at least one predefined fault into the autonomy system of the vehicle comprises: (i) modifying the derived data such that at least one aspect of the modified derived data differs from the derived data that was originally generated by the autonomy system of the vehicle, and (ii) causing the vehicle to autonomously operate in accordance with the modified derived data.

In example embodiments, modifying the derived data such that at least one aspect of the modified derived data differs from the derived data that was originally generated by the autonomy system of the vehicle comprises: modifying at least one of (i) derived data generated by the autonomy system of the vehicle that is indicative of the vehicle's perception of the test environment, (ii) derived data generated by the autonomy system of the vehicle that is indicative of a predicted future behavior of one or more objects perceived by the vehicle in the test environment, (iii) derived data generated by the autonomy system of the vehicle that defines a plan for the autonomous operation of the vehicle in the future, or (iv) derived data generated by the autonomy system of the vehicle that defines instructions for executing the plan.

In example embodiments, capturing data indicative of a response by a response mechanism of the vehicle comprises capturing data indicative of a response by a computer-based response mechanism of the vehicle to the vehicle autonomously operating in accordance with the at least one injected fault.

Moreover, various embodiments of the present technology involve a computing system comprising at least one processor, a non-transitory computer-readable medium, and program instructions stored on the non-transitory computer-readable medium that are executable by the at least one processor such that the computing system is configured to carry out the aforementioned method functions.

Additionally, various embodiments of the present technology involve a non-transitory computer-readable medium comprising program instructions stored thereon that are executable by at least one processor such that a computing system is configured to carry out the aforementioned method functions.

One of ordinary skill in the art will appreciate these as well as numerous other embodiments in reading the following disclosure.

BRIEF DESCRIPTION OF THE DRAWINGS

FIG. 2B depicts a simplified diagram of an example response-time graph corresponding to the AV's responses to the various injected faults illustrated in FIG. 2A.

FIG. 8 depicts a simplified block diagram of certain aspects of an example AV.

DETAILED DESCRIPTION

Figure 1:
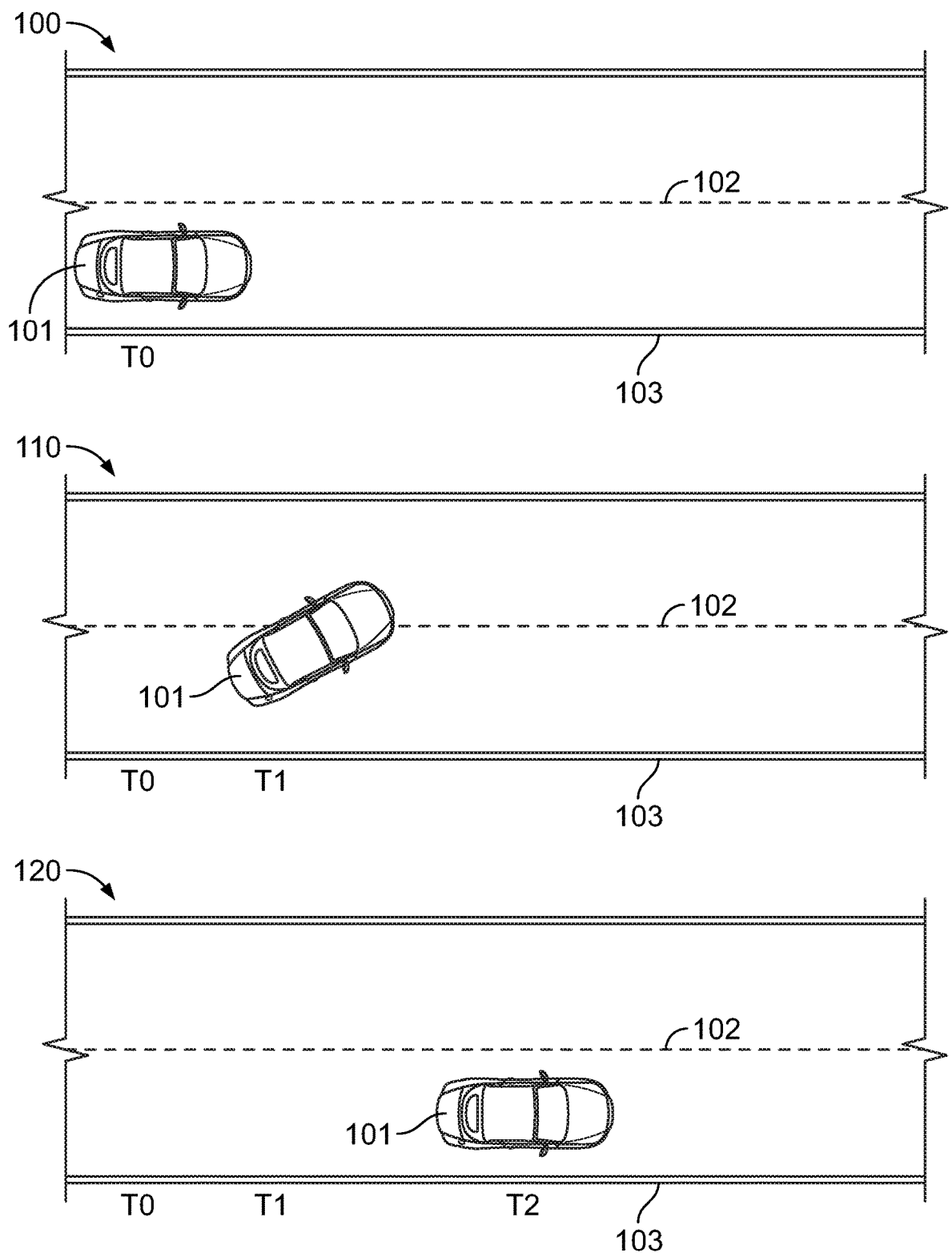
FIG. 1 depicts three simplified top down views of an AV traveling down a road at three different points in time.

As discussed above, vehicles are increasingly being equipped with technology that enables them to operate in an autonomous mode in which the vehicles are capable of sensing their surrounding environment and safely driving with little or no human input, as appropriate. These vehicles may be referred to herein as "autonomous vehicles" or "AVs" (which may cover any type of vehicle having autonomous technology, including but not limited to fully-autonomous vehicles and semi-autonomous vehicles), and the autonomous technology that enables an AV to operate in an autonomous mode may be referred to herein as the AV's "autonomy system."

In this regard, an AV's autonomy system typically includes a complex, integrated arrangement of subsystems, each comprising a combination of software and hardware, that collectively enable an AV to perceive its surrounding environment, predict how objects in that perceived environment will behave, define a behavior plan for the AV based on the prediction, and safely maneuver in the perceived environment in accordance with the behavior plan.

Safety is of the upmost importance whenever an AV is to autonomously perform a vehicle operation. Accordingly, an AV typically undergoes rigorous safety testing as part of the process of designing and validating the AV's autonomy system.

In practice, safety testing involves exposing an AV to theoretical scenarios that the AV could possibly experience at some point in time in the future when the AV is operating in real-world environments outside of a safety testing context (e.g., outside of a "test mission"). For instance, safety testing may involve subjecting an AV to faults that could theoretically occur at the AV, such as theoretical malfunctions or failures of some aspect of the AV's autonomy system or theoretical AV behavior that is not in compliance with the AV's operational design domain (ODD), among other examples of theoretical faults. In practice, a theoretical fault could occur at various points within the AV's complex autonomy system (or some other complicated system of the AV). Because of the complexity of the AV's autonomy system, it would be beneficial to be able to safety test specific subsystems of the autonomy system to evaluate how the specific subsystems respond—in terms of timing and/or response decisions—to being exposed to different types of faults. However, existing technology falls short of enabling such isolated safety testing and consequently, does not permit isolating a specific subsystem of an autonomy system to evaluate its particular responses to different types of faults.

In operation, in response to being exposed to a given theoretical fault, an AV typically has one or more response mechanisms that detect and react to the given theoretical fault. As one possibility, the AV may include an automated, on-board system that is separate from, or integrated with, the AV's autonomy system that is configured to detect and react to a given theoretical fault. In this regard, an AV may be designed with failsafe mechanisms such that, if some aspect of the AV's autonomy system experiences a given fault, the AV can determine that the given fault was experienced, account for it such as by relying on a redundant, failsafe mechanism that did not experience the given fault, and then continue operating in a safe manner.

As another possibility, a human "safety driver" may pilot the AV during a test mission, and the safety driver may detect and react to a given theoretical fault that the AV is exposed to. For instance, the AV could be exposed to a theoretical fault that prevents the AV from autonomously braking early enough for an upcoming stop sign, which may lead the safety driver to detect that the AV is not autonomously braking early enough for the stop sign, switch the AV from an autonomous mode to a manual mode (which may also be referred to as "disengaging" the autonomy system), and then manually apply the AV's brakes. Other types of response mechanisms are also possible.

Regardless of whether the AV's response mechanism is an automated, on-board system or a safety driver, there may be some amount of time that passes between when the AV is exposed to a given theoretical fault and when the response mechanism detects and reacts to that given theoretical fault. In other words, there may be some amount of response time for any of the AV's response mechanisms. In practice, different types of theoretical faults typically correspond to different response times, which can further vary depending on the particular AV response mechanism that is being utilized.

As an illustrative example of response time, FIG. 1 includes three top down views 100, 110, and 120 of an AV 101 traveling down a two-lane road that is divided by a centerline 102 at three different points in time. In particular, top down view 100 shows AV 101 traveling down the two-lane road within centerline 102 and shoulder line 103 at a first point in time $T_0$, which is prior to AV 101 being exposed to a theoretical fault. At a second point in time $T_1$, top down view 110 shows AV 101 veering across centerline 102 of the two-lane road, which is a result of AV 101 being exposed to a theoretical control fault affecting the AV's steering. At a third point in time $T_2$, top down view 120 shows AV 101 being brought back within centerline 102 and shoulder line 103, which is a result of a response mechanism of AV 101 (e.g., an automated response system or safety driver) detecting and reacting to the control fault. In this example, the response time is defined by the amount of time between the AV being exposed to the control fault ($T_1$) and the AV's response mechanism taking a corrective action with respect to the control fault ($T_2$) (e.g., a "reaction time" defined by how long it takes a safety driver of an AV to react to the AV being exposed to a fault by disengaging the AV's autonomy system). However, a response time can be defined in other manners as well.

In practice, the extent of the response time and characteristics of any responsive actions (e.g., steering, braking, and/or throttle actions) to a given theoretical fault are key factors in determining the risk associated with the given theoretical fault and how best to proactively account for the possibility of that theoretical fault occurring, such as by taking proactive design and engineering countermeasures while developing AVs. In this regard, it is typically desirable to design an AV (and to train safety drivers) such that response times are minimized and responsive actions are optimized so that, if an AV ever happens to experience one of these theoretical faults while operating in the real world outside of a testing context, the AV (or the safety driver) can quickly and optimally handle the situation and cause the AV to return to operating in a safe, expected manner.

To help achieve this goal, it is important to have accurate estimates for the respective response times and/or characteristics of any responsive actions of an AV's response mechanisms to different types of faults that are experienced under different types of conditions. Indeed, such information may be used to derive insights that may inform the design of automated response systems, the design of various data science models that facilitate autonomous operations, and the evaluation and/or training of safety drivers, among other possible beneficial uses of this information. However, existing safety-testing approaches typically only permit evaluating an AV's response to a given fault as a whole and do not allow for isolating such evaluation on a particular subsystem of the AV's autonomy system. Thus, one advantage of the technology disclosed herein is that a particular subsystem of the AV's autonomy system can be targeted with different faults and resulting response decisions and/or response times can be evaluated.

As mentioned before, an AV's response mechanisms are evaluated during safety testing, which is typically performed in a specific type of environment (e.g., a specific "test environment"). For example, an AV may be tested under conditions in which an environment being perceived by the AV's autonomy system is partially or fully "artificial," in the sense that the AV's autonomy system is processing and using data representative of an environment that has been partially or fully generated by a software simulation program (or the like) instead of being captured by the AV's sensors. As another example, an AV may be tested under conditions in which an environment being perceived by the AV's autonomy system is real but "controlled," in the sense that the AV's autonomy system is processing and using data representative of a surrounding real-world environment that has been captured by the AV's sensors but the characteristics of that surrounding real-world environment (e.g., the real-world objects that are present in the environment and their behavior) are all "staged."

One benefit of performing safety tests in such environments is that test conditions can be repeated, which generally makes it possible to obtain numerous test results under the same set of conditions from which insights can be derived. However, there are some disadvantages of artificial or controlled test environments. For instance, testing in an artificial environment requires time, human labor, and computing resources to generate an artificial environment and/or artificial objects therein along with their respective artificial movements. Likewise, testing in a controlled environment typically requires having access to an isolated test site that serves as the controlled environment (which is often not available) and also requires time and human labor to "stage" particular test conditions (which are often rudimentary) that the AV will be exposed to. Moreover, testing in artificial or controlled test environments typically does not provide the most reliable and complete picture of how an AV's response mechanisms will function in uncontrolled real-world environments.

Thus, it is advantageous to test AVs in uncontrolled real-world environments. In this way, an evaluation can be performed regarding how AV autonomy systems and/or response mechanisms behave in the real world while AVs are exposed to real-world conditions, and this evaluation can be used to design even safer AV autonomy systems. However, because such testing is performed in uncontrolled real-world environments, it is difficult to repeat a given test a meaningful number of times under the same set of conditions, which is usually needed to derive insights regarding AV autonomy systems.

In view of the foregoing, it is apparent that there are deficiencies in existing safety-testing approaches.

The example embodiments described herein are generally directed to technological advancements to such existing approaches. For instance, one aspect of the present disclosure involves a fault-injection subsystem that is incorporated into an autonomy system of an AV and that facilitates repeatable testing of response times and/or responsive actions to faults that could theoretically occur at the AV, where such testing can be performed under various real-world conditions. In operation, the fault-injection subsystem functions to automatically inject one or more predefined types of faults into an AV's autonomy system during a test mission by applying predefined rules to any number of real-world variables related to the AV, such as the AV's state (e.g., location, speed, etc.), time of day, weather and other ambient conditions, and/or mission history, among other possibilities.

Figure 2A:
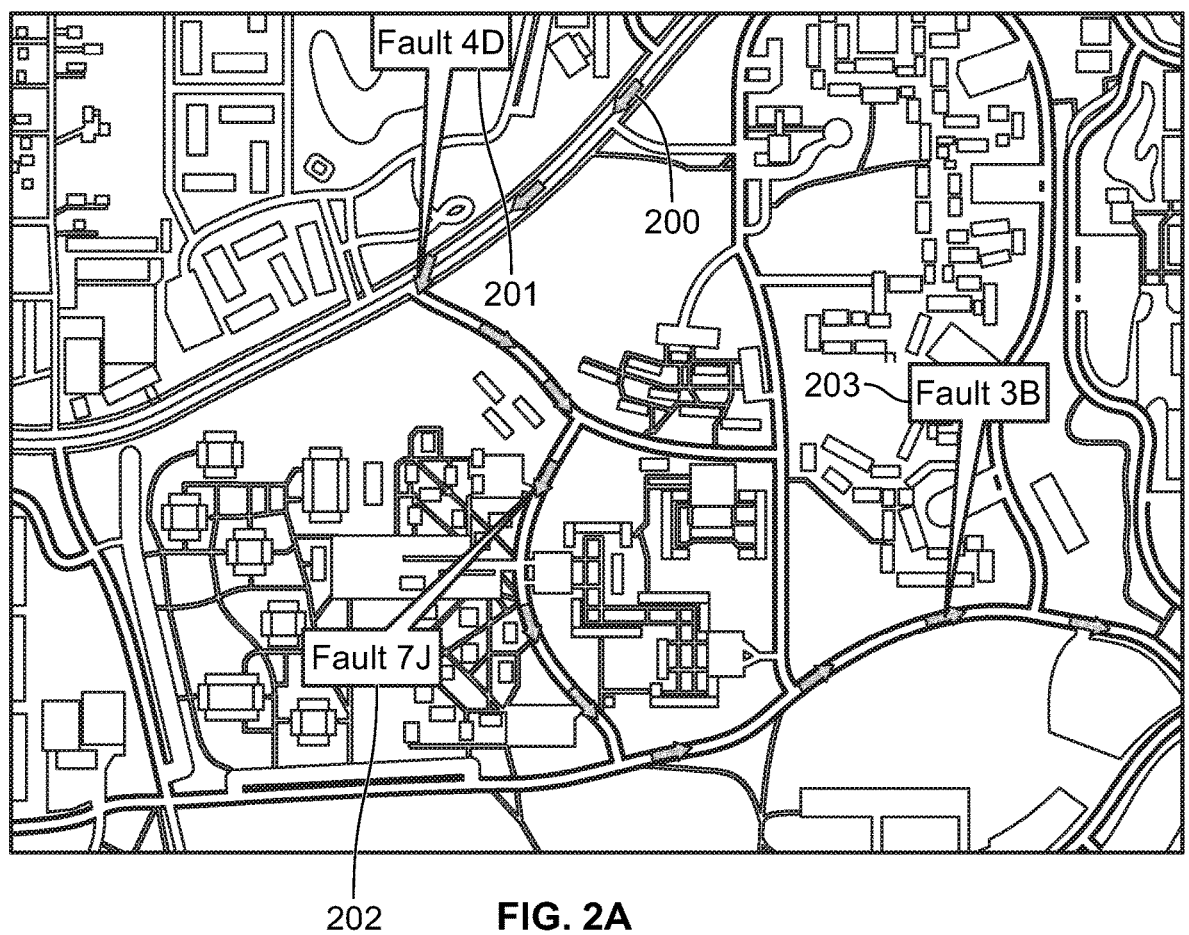
FIG. 2A depicts a simplified diagram of a portion of a test mission performed by an AV during which the AV's fault-injection subsystem automatically injected various faults into the AV's autonomy system based on certain test-mission variables related to the AV during the mission.

As an illustrative example, FIG. 2A provides a simplified illustration representing a portion of a test mission performed by an AV during which the AV's fault-injection subsystem automatically injected various faults into the AV's autonomy system based on values for certain variables related to the AV's operation in its surrounding test environment, which in this example is a real-world test environment. As shown, a series of arrows 200 represents the AV's path during the depicted portion of the test mission, and three faults that were injected during the depicted portion of the test mission are identified by fault markers 201, 202, and 203. In particular, fault marker 201 identifies a spot during the test mission where the AV's fault-injection subsystem injected a first fault, which may have been a result of the AV (i) being located within a threshold distance from a particular geographic location (e.g., within a "geofence" around a particular set of GPS coordinates) and (ii) traveling below a threshold speed. Fault marker 202 identifies a spot during the test mission where the AV's fault-injection subsystem injected a second fault, which may have been a result of the AV (i) being located within a threshold distance from a particular type of location (e.g., a type of area where pedestrians are expected) and (ii) perceiving a threshold number of objects belonging to a first particular class of interest (e.g., at least one object belonging to a pedestrian class). Fault marker 203 identifies a spot during the test mission where the AV's fault-injection subsystem injected a third fault, which may have been a result of the AV (i) not experiencing any other fault for a threshold amount of time and (ii) not perceiving any object belonging to a second particular class of interest (e.g., an object belonging to a vehicle class). Other examples of contextual factors that may contribute to a fault-injection subsystem automatically injecting a fault are also possible, some of which are discussed later.

In any event, data that is indicative of the AV's responses to the faults that were injected during the test mission may then be captured and analyzed in order to derive insights regarding responses for different types of faults in different circumstances, which may in turn be used to assist with various tasks—including but not limited to the design and validation of autonomy systems and/or automated response systems and/or the training of safety drivers. These as well as various other technological advancements to existing approaches for performing safety testing on AVs are described in more detail below.

As one example of data that may be captured indicative of the AV's responses to injected faults from which insights may be derived, FIG. 2B provides a simplified illustration of an example response-time graph 210 corresponding to the AV's responses to the three faults that were injected during the portion of the test mission depicted in FIG. 2A. In particular, as shown, (i) for the first injected fault (e.g., "Fault 4D"), a response mechanism of the AV had a first response time as represented by response-time bar 211, (ii) for the second injected fault (e.g., "Fault 7J"), a response mechanism of the AV had a second response time as represented by response-time bar 212, and (iii) for the third injected fault (e.g., "Fault 3B"), a response mechanism of the AV had a third response time as represented by response-time bar 213. In this example, the first and third response times were less than a particular response-time threshold represented by threshold line 214, which indicates that the AV's handling of the first and third injected faults was satisfactory. On the other hand, the second response time as represented by response-time bar 212 exceeded the particular response-time threshold represented by threshold line 214, which indicates that there is room for further development and/or refinement of the AV's handling of the second injected fault.

Figure 3A:
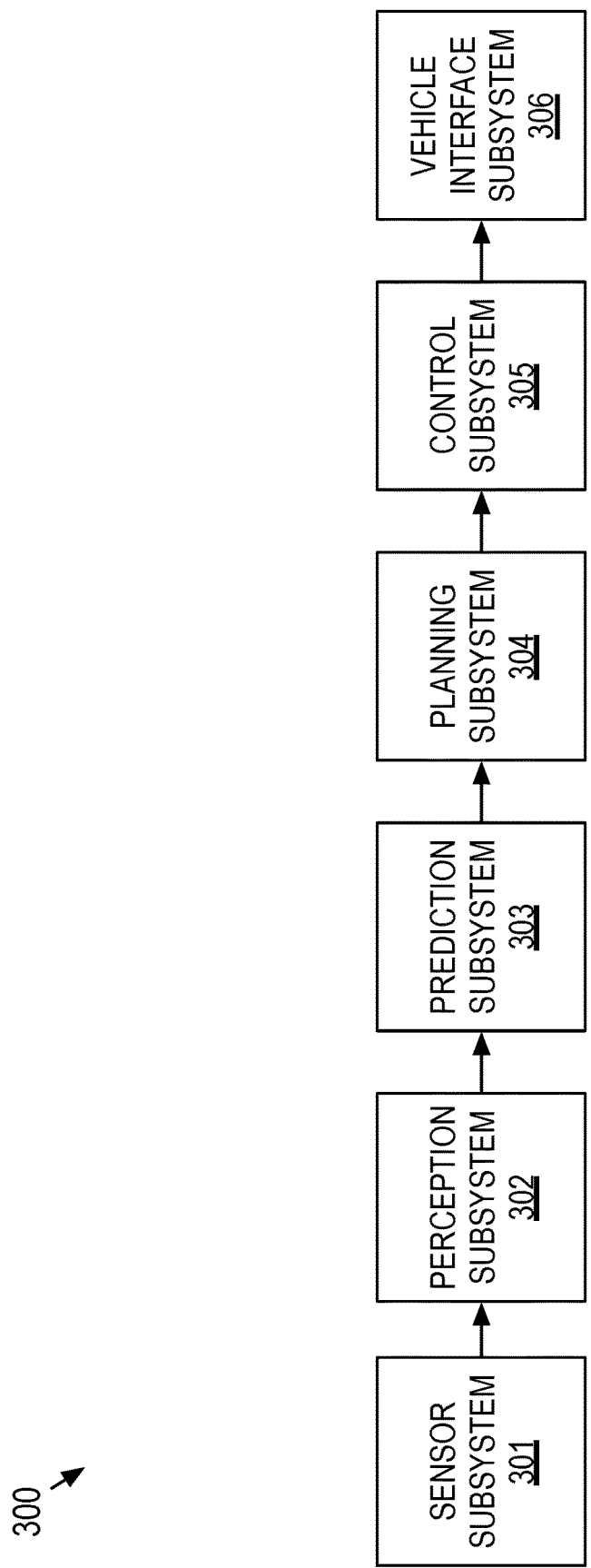
FIG. 3A depicts a functional block diagram of an example autonomy system of an AV.

Turning now to FIG. 3A, a functional diagram is provided of an example autonomy system 300 of an AV (e.g., a semi- or fully-autonomous vehicle). Additional details regarding other aspects of an AV are discussed later with reference to FIG. 8.

In general, autonomy system 300 includes a number of different subsystems that are each tasked with performing a specific subset of functions that facilitate autonomous operation of the AV. In practice, each of these subsystems may be implemented in the form of program instructions that are stored in data storage of an on-board computing system of the AV and are executable by at least one processor of the on-board computing system to carry out the subsystem's specific subset of functions, although other implementations are possible as well—including the possibility that different subsystems could be implemented via different hardware components of the AV.

As shown in FIG. 3A, in one embodiment, the functional subsystems of autonomy system 300 may include (i) a sensor subsystem 301 that generally functions to capture sensor data that is representative of the environment being perceived by the AV (i.e., the AV's "surrounding environment") and/or the AV's operation within that environment, (ii) a perception subsystem 302 that generally functions to derive a representation of the surrounding environment being perceived by the AV, (ii) a prediction subsystem 303 that generally functions to predict the future state of each object detected in the AV's surrounding environment, (iii) a planning subsystem 304 that generally functions to derive a behavior plan for the AV, (iv) a control subsystem 305 that generally functions to transform the behavior plan for the AV into control signals for causing the AV to execute the behavior plan, and (v) a vehicle-interface subsystem 306 that generally functions to translate the control signals into a format that can be interpreted and executed by components that control the physical operation of the AV (e.g., actuators). However, it should be understood that the functional subsystems of autonomy system 300 may take various other forms as well. The combination of perception subsystem 302, prediction subsystem 303, planning subsystem 304, and control subsystem 305 may be referred to herein as the "autonomy pipeline." Each of these example subsystems will now be described in further detail below.

For instance, the subsystems of autonomy system 300 may begin with sensor subsystem 301, which may comprise a variety of sensors, each of which is generally configured to detect one or more particular stimuli based on the AV operating in an environment (e.g., a real-world environment) and then output sensor data that is indicative of one or more measured values of the one or more stimuli at one or more capture times (which may each comprise a single instant of time or a range of times). In practice, this sensor data is representative of the AV's surrounding environment and/or the AV's operation within that surrounding environment. Examples of this sensor data may include two-dimensional (2D) sensor data (e.g., image data) that provides a 2D representation of the AV's surrounding environment, three-dimensional (3D) sensor data (e.g., Light Detection and Ranging (LIDAR) data) that provides a 3D representation of the AV's surrounding environment, and/or state data (e.g., Inertial Measurement Unit (IMU) data) for the AV that indicates the past and current position, orientation, velocity, and/or acceleration of the AV. Additional details regarding sensor systems are discussed later with reference to FIG. 8.

As shown in FIG. 3A, sensor subsystem 301 may pass its captured sensor data to perception subsystem 302. In operation, perception subsystem 302 may be configured to fuse together various different types of "raw" data that relates to the AV's perception of its surrounding environment and thereby derive a representation of the surrounding environment being perceived by the AV. In this respect, the "raw" data that is used by perception subsystem 302 to derive the representation of the AV's surrounding environment may take any of various forms.

For instance, at a minimum, the raw data that is used by perception subsystem 302 may include multiple different types of sensor data captured by sensor subsystem 301 of the AV that is configured to capture sensor data that is representative of the environment being perceived by the AV and/or the AV's operation within that environment.

Additionally, the raw data that is used by perception subsystem 302 may include other types of raw data as well. For example, the raw data may additionally include map data associated with the AV's location, such as high-definition geometric and/or semantic map data, which may be preloaded onto the AV's on-board computing system and/or obtained from a remote computing system. As another example, the raw data may additionally include navigation data for the AV that indicates a specified origin and/or specified destination, which may be obtained from a remote computing system (e.g., a transportation matching platform) and/or input by a human riding in the AV via a user-interface component. As yet another example, the raw data that is used by perception subsystem 302 may include other types of data that may provide context for the AV's perception of its surrounding environment, such as weather data and/or traffic data, which may be obtained from a remote computing system. The raw data that is used by perception subsystem 302 may include other types of data as well.

Advantageously, by fusing together multiple different types of raw data (e.g., both 2D sensor data and 3D sensor data), perception subsystem 302 is able to leverage the relative strengths of these different types of raw data in a way that may produce a more accurate and precise representation of the surrounding environment being perceived by the AV.

Further, the function of deriving the representation of the surrounding environment perceived by the AV using the raw data may include various aspects. For instance, one aspect of deriving the representation of the surrounding environment perceived by the AV may involve determining a current state of the AV itself, such as a current position, a current orientation, a current velocity, and/or a current acceleration, among other possibilities. In this respect, perception subsystem 302 may also employ a localization technique such as Simultaneous Localization and Mapping (SLAM) to assist in the determination of the AV's current position and/or orientation. Alternatively, it is possible that the AV's on-board computing system may run a separate localization service that determines position and/or orientation values for the AV based on raw data, in which case these position and/or orientation values may serve as another input to perception subsystem 302.

Another aspect of deriving the representation of the surrounding environment perceived by the AV using the raw data may involve detecting objects within the AV's surrounding environment (e.g., real-world objects), which may result in the determination of class labels, bounding boxes, or the like for each detected object. In this respect, the particular classes of objects that are detected by perception subsystem 302 (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 302 may be configured to detect objects within the AV's surrounding environment using any type of object-detection model now known or later developed, including but not limited object-detection models based on convolutional neural networks (CNNs).

Yet another aspect of deriving the representation of the surrounding environment perceived by the AV using the raw data may involve determining a current state of each object detected in the AV's surrounding environment, such as a current position (which could be reflected in terms of coordinates and/or in terms of a distance and direction from the AV), a current orientation, a current velocity, and/or a current acceleration of each detected object, among other possibilities. In this respect, the current state of each detected object may be determined either in terms of an absolute measurement system or in terms of a relative measurement system that is defined relative to a state of the AV, among other possibilities.

The function of deriving the representation of the surrounding environment perceived by the AV using the raw data may include other aspects as well.

Further yet, the derived representation of the surrounding environment perceived by the AV may incorporate different information about the surrounding environment perceived by the AV, examples of which may include (i) a respective set of information for each object detected in the AV's surrounding (e.g., a class label, a bounding box, and/or state information for each detected object), (ii) a set of information for the AV itself (e.g., state information), and/or (iii) other semantic information about the surrounding environment (e.g., time of day, weather conditions, traffic conditions, etc.). The derived representation of the surrounding environment perceived by the AV may incorporate other types of information about the surrounding environment as well.

Still further, the derived representation of the surrounding environment perceived by the AV may be embodied in various forms. For instance, as one possibility, the derived representation of the surrounding environment perceived by the AV may be embodied in the form of a data structure that represents the surrounding environment perceived by the AV, which may comprise respective data arrays (e.g., vectors) that contain information about the objects detected in the surrounding environment perceived by the AV, a data array that contains information about the AV, and/or one or more data arrays that contain other semantic information about the surrounding environment. Such a data structure may be referred to as a "parameter-based encoding."

As another possibility, the derived representation of the surrounding environment perceived by the AV may be embodied in the form of a rasterized image that represents the surrounding environment perceived by the AV in the form of colored pixels. In this respect, the rasterized image may represent the surrounding environment perceived by the AV from various different visual perspectives, examples of which may include a "top down" view and a "bird's eye" view of the surrounding environment, among other possibilities. Further, in the rasterized image, the objects detected in the surrounding environment of the AV (and perhaps the AV itself) could be shown as color-coded bitmasks and/or bounding boxes, among other possibilities.

The derived representation of the surrounding environment perceived by the AV may be embodied in other forms as well.

As shown in FIG. 3A, perception subsystem 302 may pass its derived representation of the AV's surrounding environment to prediction subsystem 303. In turn, prediction subsystem 303 may be configured to use the derived representation of the AV's surrounding environment (and perhaps other data) to predict a future state of each object detected in the AV's surrounding environment at one or more future times (e.g., at each second over the next 5 seconds)—which may enable the AV to anticipate how the perceived objects in its surrounding environment are likely to behave in the future and then plan its behavior in a way that accounts for this future behavior.

Prediction subsystem 303 may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 303 is configured to predict this type of future state information for a detected object at multiple future times, such a time sequence of future states may collectively define a predicted future trajectory of the detected object. Further, in some embodiments, prediction subsystem 303 could be configured to predict multiple different possibilities of future states for a detected (e.g., by predicting the 3 most-likely future trajectories of the detected object). Prediction subsystem 303 may be configured to predict other aspects of a detected object's future behavior as well.

In practice, prediction subsystem 303 may predict a future state of an object detected in the AV's surrounding environment in various manners, which may depend in part on the type of detected object. For instance, as one possibility, prediction subsystem 303 may predict the future state of a detected object using a data science model that is configured to (i) receive input data that includes one or more derived representations output by perception subsystem 302 at one or more perception times (e.g., the "current" perception time and perhaps also one or more prior perception times), (ii) based on an evaluation of the input data, which includes state information for the objects detected in the AV's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model may be created by an off-board computing system (e.g., a backend platform) and then loaded onto the AV's on-board computing system, although it is possible that a future-state model could be created by the AV's on-board computing system itself. Either way, the future-state model may be created using any modeling technique now known or later developed, including but not limited to a machine-learning technique that may be used to iteratively "train" the data science model to predict a likely time sequence of future states of an object based on training data that comprises both test data (e.g., historical representations of surrounding environments at certain historical perception times) and associated ground-truth data (e.g., historical state data that indicates the actual states of objects in the surrounding environments during some window of time following the historical perception times).

Prediction subsystem 303 could predict the future state of a detected object in other manners as well. For instance, for detected objects that have been classified by perception subsystem 302 as belonging to certain classes of static objects (e.g., roads, curbs, lane markings, buildings, etc.), which generally do not have the potential to move, prediction subsystem 303 may rely on this classification as a basis for predicting that the future state of the detected object will remain the same at each of the one or more future times (in which case the state-prediction model may not be used for such detected objects). However, it should be understood that detected objects may be classified by perception subsystem 302 as belonging to other classes of static objects that have the potential to change state despite not having the potential to move, in which case prediction subsystem 303 may still use a future-state model to predict the future state of such detected objects. One example of a static object class that falls within this category is a traffic light, which generally does not have the potential to move but may nevertheless have the potential to change states (e.g. between green, yellow, and red) while being perceived by the AV.

After predicting the future state of each object detected in the surrounding environment perceived by the AV at one or more future times, prediction subsystem 303 may then either incorporate this predicted state information into the previously-derived representation of the AV's surrounding environment (e.g., by adding data arrays to the data structure that represents the surrounding environment) or derive a separate representation of the AV's surrounding environment that incorporates the predicted state information for the detected objects, among other possibilities.

As shown in FIG. 3A, prediction subsystem 303 may pass the one or more derived representations of the AV's surrounding environment to planning subsystem 304. In turn, planning subsystem 304 may be configured to use the one or more derived representations of the AV's surrounding environment (and perhaps other data) to derive a behavior plan for the AV, which defines the desired driving behavior of the AV for some future period of time (e.g., the next 5 seconds).

The behavior plan that is derived for the AV may take various forms. For instance, as one possibility, the derived behavior plan may comprise a planned trajectory for the AV that specifies a planned state of the AV at each of one or more future times (e.g., each second over the next 5 seconds), where the planned state for each future time may include a planned position of the AV at the future time, a planned orientation of the AV at the future time, a planned velocity of the AV at the future time, and/or a planned acceleration of the AV (whether positive or negative) at the future time, among other possibilities.

As another possibility, the derived behavior plan for the AV may comprise one or more planned actions that are to be performed by the AV during the future period of time, where each planned action is defined in terms of the type of action to be performed by the AV and a time and/or location at which the AV is to perform the action, among other possibilities.

As yet another possibility, the derived behavior plan for the AV may comprise one or more deviation boundaries (e.g., "reasonable bounds") corresponding to one or more aspects of the behavior plan. In practice, a given deviation boundary defines how closely the AV must operate to a given aspect of the behavior plan before the AV's autonomy system is disengaged. In other words, if the AV theoretically exceeded a given deviation boundary for a given aspect of the behavior plan while operating in accordance with that given aspect of the plan, then the AV's autonomy system would be disengaged. For example, a deviation boundary may define a distance from a planned trajectory that the AV is permitted to stray before its autonomy system disengages. As another example, a deviation boundary may define a speed differential that the AV is permitted to operate within before its autonomy system disengages. Other examples of deviation boundaries are also possible.

The derived behavior plan for the AV may define other planned aspects of the AV's behavior as well.

Further, in practice, planning subsystem 304 may derive the behavior plan for the AV in various manners. For instance, as one possibility, planning subsystem 304 may be configured to derive the behavior plan for the AV by (i) deriving a plurality of different "candidate" behavior plans for the AV based on the one or more derived representations of the AV's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for the AV. Planning subsystem 304 may derive the behavior plan for the AV in various other manners as well.

After deriving the behavior plan for the AV, planning subsystem 304 may pass data indicating the derived behavior plan to control subsystem 305. In turn, control subsystem 305 may be configured to transform the behavior plan for the AV into one or more control signals (e.g., a set of one or more command messages) that enable the AV to execute the behavior plan. For instance, based on the behavior plan for the AV, control subsystem 305 may be configured to generate control signals that enable the AV to adjust its throttle in a specified manner, adjust its steering in a specified manner, and/or brake in a specified manner, among other possibilities.

As shown in FIG. 3A, control subsystem 305 may then pass the one or more control signals that enable the AV to execute the behavior plan to vehicle-interface subsystem 306. In turn, vehicle-interface subsystem 306 may be configured to translate the one or more control signals into a format that can be interpreted and executed by components of the AV's vehicle-control system that controls the physical operation of the AV. For example, vehicle-interface subsystem 306 may be configured to translate the one or more control signals into one or more control messages that are defined according to a particular format or standard, such as a CAN bus standard and/or some other format or standard that is used by the AV's vehicle-control system.

In turn, vehicle-interface subsystem 306 may be configured to direct the one or more control signals to the appropriate control components of the AV. For instance, the AV may include a plurality of actuators that are each configured to control a respective aspect of the AV's physical operation, such as a throttle actuator that is configured to control the vehicle's throttle (not shown), a steering actuator that is configured to control the vehicle components responsible for steering (not shown), and a braking actuator that is configured to control the vehicle components responsible for braking (not shown), among other possibilities. In such an arrangement, vehicle-interface subsystem 306 of autonomy system 300 may be configured to direct acceleration-related control signals to the throttle actuator, steering-related control signals to the steering actuator, and braking-related control signals to the braking actuator. However, it should be understood that the control components of the AV may take various other forms as well.

Notably, the subsystems of autonomy system 300 may be configured to perform the above functions in a repeated manner, such as many times per second, which may enable the AV to continually update both its understanding of the surrounding environment and its planned behavior within that surrounding environment.

As discussed before, AVs are rigorously and routinely tested to help ensure that the AVs are designed to operate in a safe manner, and it is advantageous for such tests to be performed in uncontrolled real-world environments while AVs are subjected to real-world conditions. However, given the lack of control over such environments, it is often difficult to run a given test a meaningful number of times in uncontrolled real-world environments under the same set of conditions, which is usually required to gain insights that can inform the design and validation of an AV's autonomy system and response mechanisms.

Figure 3B:
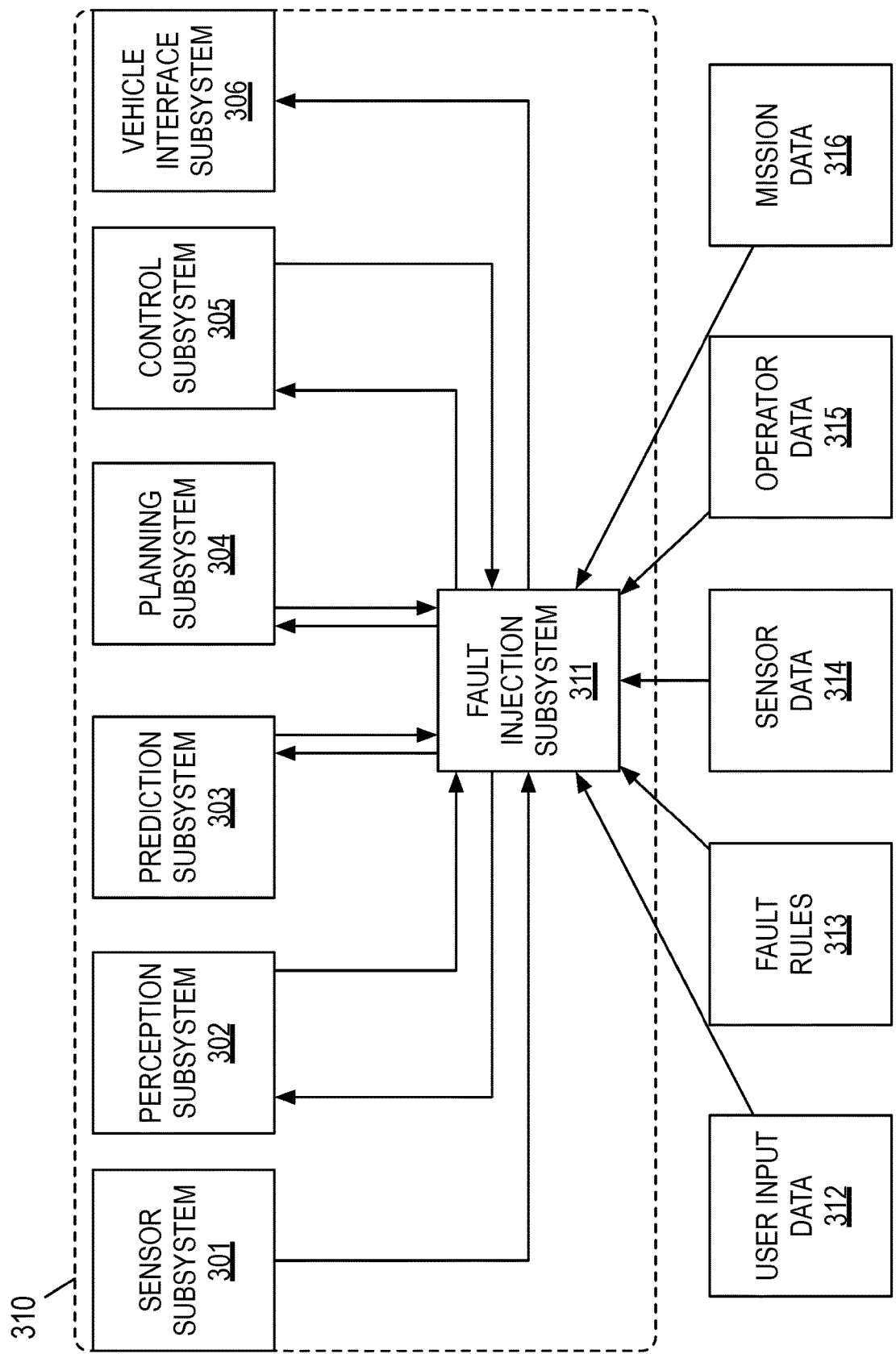
FIG. 3B depicts a functional block diagram of an example autonomy system of an AV that includes a fault-injection subsystem.

To help address these and other problems with existing approaches for testing AVs, autonomy system 300 of FIG. 3A may be modified to include a fault-injection subsystem that is configured to enable repeatable testing in one or more different types of test environments, such as uncontrolled real-world environments with real-world conditions or partially or fully simulated environments and conditions, among other possibilities. In this respect, FIG. 3B depicts a functional diagram of an example autonomy system 310 of an AV in which aspects of the present disclosure may be implemented.

As shown, autonomy system 310 includes the functional components of autonomy system 300 shown in FIG. 3A and a fault-injection subsystem 311. In contrast to autonomy system 300, in autonomy system 310, the respective outputs of sensor subsystem 301, perception subsystem 302, prediction subsystem 303, planning subsystem 304, and control subsystem 305 pass through fault-injection subsystem 311 before reaching the next downstream subsystem. As discussed in further detail below, based on one or more contextual variables corresponding to the AV's operation, fault-injection subsystem 311 may inject different predefined faults into various points within the autonomy system's data flow. As also illustrated, fault-injection subsystem 311 is configured to utilize a variety of data that affects the operation of fault-injection subsystem 311, which is discussed in further detail below.

Example functions related to automatic fault injection will now be discussed in further detail. For purposes of example and illustration only, the example functions are described in the context of example autonomy system 310 of FIG. 3B and as being performed in whole or in part by fault-injection subsystem 311. To help describe some of these functions, flow diagrams may also be referenced to describe combinations of functions that may be performed. In some cases, each flow-diagram block may represent a subsystem or portion of program code that includes instructions that are executable by at least one processor to implement specific logical functions or steps in a process. The program code may be stored on any type of computer-readable medium, such as non-transitory computer-readable media. Moreover, a person of ordinary skill in the art will appreciate that the blocks shown in the flow diagrams may be rearranged into different orders, combined into fewer blocks, separated into additional blocks, and/or removed based upon the particular embodiment.

Figure 4:
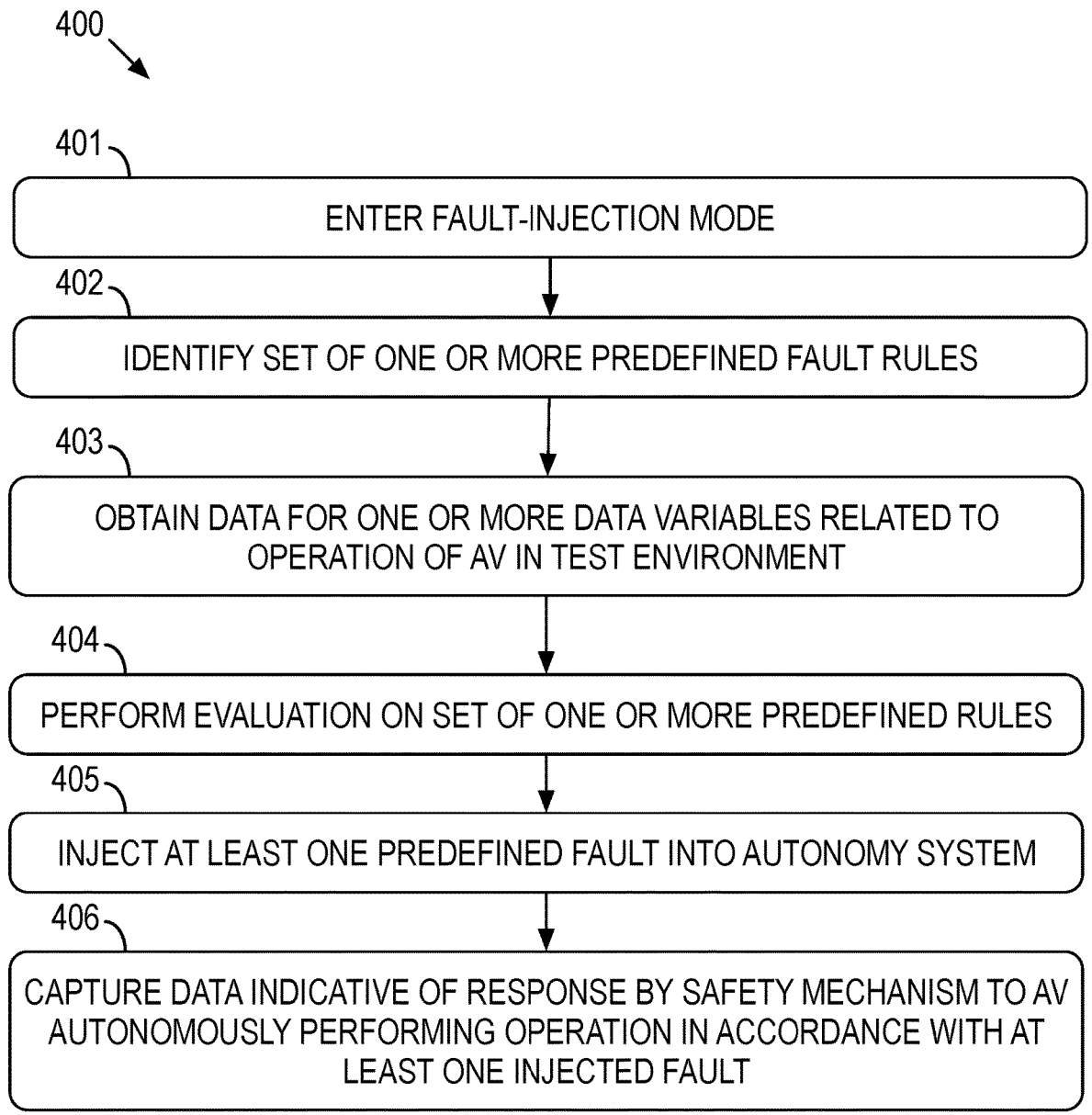
FIG. 4 depicts a flow diagram of example functions related to automatically injecting faults based on test-mission variables.

Turning now to flow diagram 400 of FIG. 4, at block 401, fault-injection subsystem 311 may enter into a fault-injection mode in which fault-injection subsystem 311 is capable of injecting faults into autonomy system 310. In practice, fault-injection subsystem 311 may enter into such a mode in various manners.

As one possibility, fault-injection subsystem 311 may receive user input data 312 that takes the form of activation data that causes fault-injection subsystem 311 to enter into the fault-injection mode. In example implementations, fault-injection subsystem 311 may receive such user input data in response to a human (e.g., an engineer, an authorized safety-driver, or the like) in the AV providing a particular input at a given user interface of the AV, such as an input that indicates that the human would like fault-injection subsystem 311 to be activated that is received at a user-interface component of the AV (e.g., a hardware button, switch, etc. on the AV's steering wheel or control console), or at an external computer (e.g., a laptop) connected to the AV that runs software that provides a fault-injection user interface, among other possibilities.

Additionally or alternatively, fault-injection subsystem 311 may receive user input data 312 that takes the form of login data that may cause fault-injection subsystem 311 to enter into the fault-injection mode or that may be received before or after fault-injection subsystem 311 enters into the fault-injection mode. For example, before piloting a test mission, a given safety driver may provide credentials (e.g., a username and password) at a user interface (e.g., a touchscreen, etc.) of the AV that are then provided to fault-injection subsystem 311 and may cause fault-injection subsystem 311 to enter into the fault-injection mode if the credentials correspond to an authorized user of the fault-injection subsystem 311. In some cases, fault-injection subsystem 311 may in turn contact a remote server (e.g., via a communication interface of the AV or of fault-injection subsystem 311 itself) with the credentials to obtain profile data indicative of a driver profile for the given safety driver. The information contained in the obtained profile may influence how fault-injection subsystem 311 operates while the given safety driver is piloting the AV during the test mission.

Fault-injection subsystem 311 may receive other types of data that causes, or is otherwise related to, fault-injection subsystem 311 entering into the fault-injection mode, and fault-injection subsystem 311 may enter into the fault-injection mode in other manners as well.

At block 402, fault-injection subsystem 311 may identify a set of one or more predefined fault rules 313 that define the circumstances in which fault-injection subsystem 311 is to inject faults into autonomy system 310. In practice, fault-injection subsystem 311 may perform this function by loading or otherwise retrieving the set of one or more predefined rules from data storage, by activating program instructions corresponding to the set of one or more predefined rules, and/or by selecting the set of one or more predefined rules from a larger set of possible rules, among other possibilities.

In example embodiments, a given predefined rule may define criteria related to an AV's operation during a test mission (e.g., criteria related to the state of the AV and/or the AV's surrounding environment) that are to be satisfied before fault-injection subsystem 311 automatically injects a given type of fault at a particular point within autonomy system 310. In this regard, in example implementations, a given predefined rule may comprise (i) a set of one or more predefined criteria, (ii) a predefined fault that is to be injected when the set of one or more predefined criteria are determined to be satisfied, and perhaps also (iii) a specified place within autonomy system 310 where the fault is to be injected (e.g., a subsystem identifier) to the extent that this information is not already encoded as part of the predefined fault. While a predefined rule generally defines one or more criteria that will trigger fault-injection subsystem 311 to inject a given fault, a predefined rule could instead define one or more criteria that will suppress fault-injection subsystem 311 from injecting a given fault. Fault rules, and in particular, fault-rule criteria, are discussed in further detail below.

At block 403, fault-injection subsystem 311 may obtain data for one or more data variables related to autonomous operation of the AV in a test environment (e.g., a real-world environment or partially or fully simulated environment). Such data may take various forms.

As one possibility, the data obtained by fault-injection subsystem 311 may include sensor data 314 that is representative of the test environment being perceived by the AV and/or the AV's operation within that test environment. In some cases, sensor data 314 may include some or all of the same data that is output by sensor subsystem 301 and serves as input data for perception subsystem 302. For example, sensor data 314 may include one or more of state data (e.g., position data), 2D sensor data (e.g., image data), 3D sensor data (e.g., LIDAR data), or environment data (e.g., weather data, lighting data, etc.). In other cases, sensor data 314 may include data from one or more sensors that may not be consumed by perception subsystem 302. Other forms of sensor data 314 may be obtained and utilized by fault-injection subsystem 311.

As another possibility, the data obtained by fault-injection subsystem 311 may include data that is output by one or more of the other autonomy-pipeline subsystems (e.g., perception subsystem 302, prediction subsystem 303, planning subsystem 304, and control subsystem 305) that provides contextual information regarding the AV's test environment, which may be referred to herein as "autonomy-pipeline data." As one particular example, data from perception subsystem 302 may provide information regarding the classes, quantity, and state of objects that are presently in proximity to the AV. In this way, fault-injection subsystem 311 can determine whether the AV is at a location that is congested with certain objects of interest (e.g., at a location with more than a threshold number of pedestrians, other vehicles, etc.). Other forms of autonomy-pipeline data may also be obtained and utilized by fault-injection subsystem 311.

As a further possibility, the data obtained by fault-injection subsystem 311 may include operator data 315 that is indicative of one or more characteristics of the present operator of the AV. For example, as discussed before, fault-injection subsystem 311 may receive data indicative of a driver profile for the particular safety driver that may be piloting the AV during a given test mission, which may provide historical information regarding the particular safety driver's prior reaction times to different types of faults. Thus, information regarding the present safety driver may affect how fault-injection subsystem 311 operates with respect to injecting faults and may even suppress certain types of faults from being injected. For instance, if historical operator data indicates that a given safety driver did not react to a given type of fault in a satisfactory manner (e.g., within a particular threshold reaction time), fault-injection subsystem 311 may inject that given type of fault in the future during a test mission piloted by that given safety driver. Other forms of operator data 315 may be obtained and utilized by fault-injection subsystem 311.

As yet another possibility, the data obtained by fault-injection subsystem 311 may include mission data 316 that provides an indication of a status of the AV's current test mission. For example, such data may indicate how long the AV has been performing its current test mission, when and/or where fault-injection subsystem 311 last injected a fault into autonomy system 310, and how frequently fault-injection subsystem 311 has been injecting faults into autonomy system 310 during the current test mission, among other possible types of mission data 316.

Fault-injection subsystem 311 may obtain data related to the AV's operation in its test environment that takes various other forms as well. For instance, although not depicted, fault-injection subsystem 311 may be configured to receive simulation data that may be fully simulated, in the sense that the simulation data is generated by a software simulation program (or the like) and does not include real-world data captured by the AV during the test mission, or partially simulated, in the sense that the simulation data is generated by a software simulation program (or the like) and is combined with real-world data captured by the AV during the test mission.

At block 404, fault-injection subsystem 311 may, based on the data obtained at block 403, perform an evaluation of the set of one or more predefined fault rules identified at block 402. For instance, for each fault rule of the set identified at block 402, fault-injection subsystem 311 may determine whether the obtained data indicates that the given fault rule's predefined one or more criteria is satisfied. In other words, fault-injection subsystem 311 may determine whether the AV's test-environment context matches that of any predefined rule such that fault-injection subsystem 311 should inject a predefined fault into autonomy system 310. In this regard, as discussed before, the predefined fault rules may include various different types of criteria related to the AV's test environment, and thus, fault-injection subsystem 311 may determine whether such rule criteria are satisfied in various manners.

As one possibility, a rule criterion may take the form of a location-based criterion. For example, a location-based criterion may include a requirement related to the AV's location, such as an identification of a particular location and a threshold distance around that particular location (e.g., a "geofence"), in which case such a location-based criterion may be considered satisfied when fault-injection subsystem 311 determines that the AV's location is presently within that threshold distance from the particular location. In example implementations, the identification of the particular location may be an identification of a particular geographic location (e.g., GPS coordinates or the like) or a particular type of location (e.g., an intersection, an open stretch of road, an up-hill or down-hill location, etc.). Other location-based criteria are also possible.

As another possibility, a rule criterion may take the form of a temporal criterion. For example, a temporal criterion may include a requirement related to the timing of the AV's test mission, such as an identification of a particular time of day or particular window of time during the day, in which case such a temporal criterion may be considered satisfied when fault-injection subsystem 311 determines that the AV is on a test mission when the particular time of day transpires or during the particular window of time. Other temporal criteria are also possible.

As yet another possibility, a rule criterion may take the form of an ambient-condition criterion. For example, an ambient-condition criterion may include a requirement that a particular ambient condition of the AV's test environment (e.g., whether real or simulated) be present and/or satisfy a threshold, in which case such an ambient-condition criterion is considered satisfied when fault-injection subsystem 311 determines (e.g., based on the obtained data) that the particular ambient condition is currently present and/or meets the threshold. Examples of ambient conditions include weather conditions that the AV could experience (e.g., rain, snow, wind, different temperatures, etc.), lighting conditions that the AV could experience (e.g., darkness, lowlight, direct sunlight, etc.), and presence (or absence) of certain classes of objects that could be in the AV's surroundings (e.g., presence of any or some threshold number of objects belonging to a given class of interest, such as pedestrians, vehicles, or bicyclists). Other ambient-condition criteria are also possible.

As a further possibility, a rule criterion may take the form of an AV-state criterion. For example, an AV-state criterion may include a requirement related to the state of the AV while it is operating in the test environment, in which case such an AV-state criterion may be considered satisfied when fault-injection subsystem 311 determines (e.g., based on the obtained data) that the current state of the AV satisfies the requirement. Examples of requirements related to the state of the AV include a requirement related to the AV's movement state (e.g., whether the AV is in motion or not), a requirement related to the AV's velocity state (e.g., whether the AV is driving above or below a given speed), a requirement related to the AV's acceleration state (e.g., whether the AV is accelerating or decelerating above or below a particular rate), a requirement related to the AV's steering state (e.g., whether the AV is turning, driving straight, driving around a bend in the road, etc.), and a requirement related to the AV's braking state (e.g., whether the AV is braking or not), among other possibilities. While a location-based criterion was described above, it should be understood that an AV's location is a particular type of state information. Other AV-state criteria are also possible.

As another possibility, a rule criterion may take the form of a test-mission criterion. For example, a test-mission criterion may include a requirement related to a particular status of a test mission, in which case such a test-mission criterion may be considered satisfied when fault-injection subsystem 311 determines that the AV's current status within the test mission satisfies that requirement. Examples of requirements related to test-mission statuses include a requirement related to elapsed time status (e.g., an amount of time that has elapsed since the start of a test mission), a requirement related to time-between-faults status (e.g., an amount of time that has elapsed since fault-injection subsystem 311 last injected a fault), and a requirement related to fault-frequency status (e.g., a number of faults over a given period of time that fault-injection subsystem 311 has injected during a test mission). Other test-mission criteria are also possible.

As yet another possibility, a rule criterion may take the form of an operator criterion. For example, an operator criterion may include a requirement related to a particular operator characteristic, in which case such an operator criterion is considered satisfied when fault-injection subsystem 311 determines that the human that is presently operating the AV during the test mission meets this requirement (e.g., based on a safety driver's respective driver profile). Examples of requirements related to operator characteristics include a requirement related to experience level (e.g., a number of safety-testing hours logged by the safety driver) and a requirement related to fault history (e.g., a number of instances of handling a particular fault, past performances in handling injected faults, etc.). Other operator criteria are also possible.

Other types of rule criteria and manners by which fault-injection subsystem 311 evaluates whether rule criteria are satisfied are also possible.

At block 405, fault-injection subsystem 311 may, based on the evaluation performed at block 404, inject at least one predefined fault into autonomy system 310, which in turn causes the AV to autonomously perform one or more operations in the test environment in accordance with the at least one injected fault. For instance, if fault-injection subsystem 311 determines that one or more criteria for a given predefined rule have been satisfied, fault-injection subsystem 311 may then inject a particular type of fault (or perhaps a combination of faults) corresponding to that given predefined rule at a predefined location within autonomy system 310, which may then cause one or more components downstream of that predefined location to perform respective autonomy functions based on the injected fault.

In practice, fault-injection subsystem 311 may inject a fault into autonomy system 310 in various manners. For example, generally speaking, fault-injection subsystem 311 may inject a fault by modifying (i) the captured sensor data that is representative of the AV's test environment and/or (ii) at least some aspect of the autonomy-pipeline data that is derived based on the captured sensor data that is representative of the AV's test environment (e.g., autonomy-pipeline data indicative of a perceived real-world agent in a lane next to the AV, a predicted future state of a real-world agent, a behavior plan that the AV is expected to follow, one or more control operations that AV is expected to perform, etc.). In this respect, fault-injection subsystem 311 may modify such data by removing, adding, and/or manipulating data corresponding to captured sensor data and/or derived autonomy-pipeline data, among other possibilities. In particular, fault-injection subsystem 311 may inject a fault into autonomy system 310 by modifying an upstream subsystem's output data (e.g., data output by perception subsystem 302) such that a modified version of the output data is received by a downstream subsystem (e.g., prediction subsystem 303). Fault-injection subsystem 311 may inject a fault in other manners as well.

In general, a fault comprises an event that causes the AV's autonomy system 310 to generate sensor and/or autonomy-pipeline data that differs in at least one aspect from sensor and/or autonomy-pipeline data that would otherwise be generated without the fault being present. In this respect, a fault may generally take the form of (i) an omission fault for which the AV fails to perform an operation it is expected to perform in connection with an experienced or anticipated test condition (e.g., fails to detect an object in the AV's surroundings, fails to stop at a stop sign, etc.) or (ii) a commission fault for which the AV performs an operation that it is not expected to perform in connection with an experienced or anticipated test condition (e.g., turns left when the AV was expected to turn right, brakes when the AV was not expected to brake, etc.). In practice, fault-injection subsystem 311 is configured to inject a variety of different types of faults.

As one possibility, fault-injection subsystem 311 may inject a sensor fault, which may involve fault-injection subsystem 311 modifying the sensor data output by sensor subsystem 301 such that input data for perception subsystem 302 includes a fault. As a first example of a sensor fault, fault-injection subsystem 311 may inject a sensor fault by removing certain sensor data captured by sensor subsystem 301, such as by discarding a portion of LIDAR point cloud data that may imitate the AV having some sort of obstruction (e.g., dust or mud) on its LIDAR unit. As another example of a sensor fault, fault-injection subsystem 311 may inject a sensor fault by manipulating certain sensor data captured by sensor subsystem 301, such as by applying a bias to orientation state data that may imitate the AV's IMU being dislodged or settling in a different orientation, by applying a deviation to velocity state data that may imitate the AV operating at a different speed, or by adding sensor data that was not actually captured by sensor subsystem 301. Other examples of sensor faults and other manners of injecting such faults are also possible.

As another possibility, fault-injection subsystem 311 may inject a perception fault, which may involve fault-injection subsystem 311 modifying the data output by perception subsystem 302 such that input data for prediction subsystem 303 includes a fault. As a first example of a perception fault, fault-injection subsystem 311 may inject a perception fault that causes autonomy subsystems downstream of perception subsystem 302 to perform autonomy functions while being wholly or partially "blind" to some or all objects of interest presently in the AV's environment. For instance, such a perception fault may apply to all agents perceived by perception subsystem 302, one or more select classes of agents (e.g., bicyclists, scooters, etc.) perceived by perception subsystem 302, some or all classes of agents perceived by perception subsystem 302 within a particular viewpoint of the AV (e.g., a particular 30° portion of the AV's 360° view), or some or all classes of agents perceived by perception subsystem 302 inside or outside of a particular proximity to the AV (e.g., outside of 5 meters from the AV). In example implementations, for this fault, fault-injection subsystem 311 may discard or otherwise remove data output by perception subsystem 302 that corresponds to the objects of interest and/or the part of the AV's view that the AV is to be "blind" to.

Figure 5A:
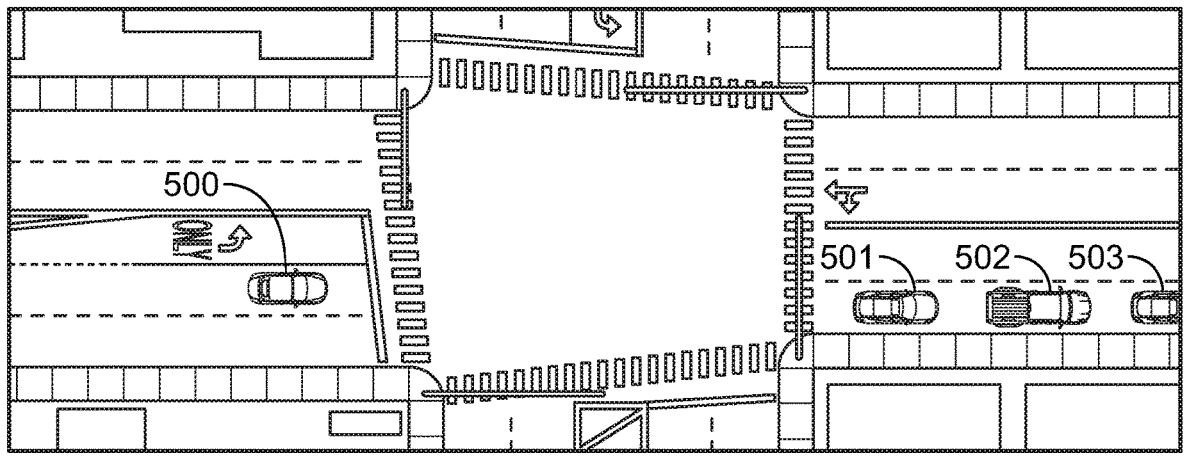
FIG. 5A depicts a simplified diagram representing a top down view of an AV's surrounding environment at a given point in time as indicated by data output from a perception subsystem.

As one example to illustrate a "blind" perception fault, FIG. 5A shows a simplified diagram representing a top down view of the AV's surrounding environment at a given point in time as indicated by data output by perception subsystem 302. As shown, perception subsystem 302 of AV 500 perceived several agents 501, 502, and 503 that perception subsystem 302 classified as belonging to a vehicle class.

Figure 5B:
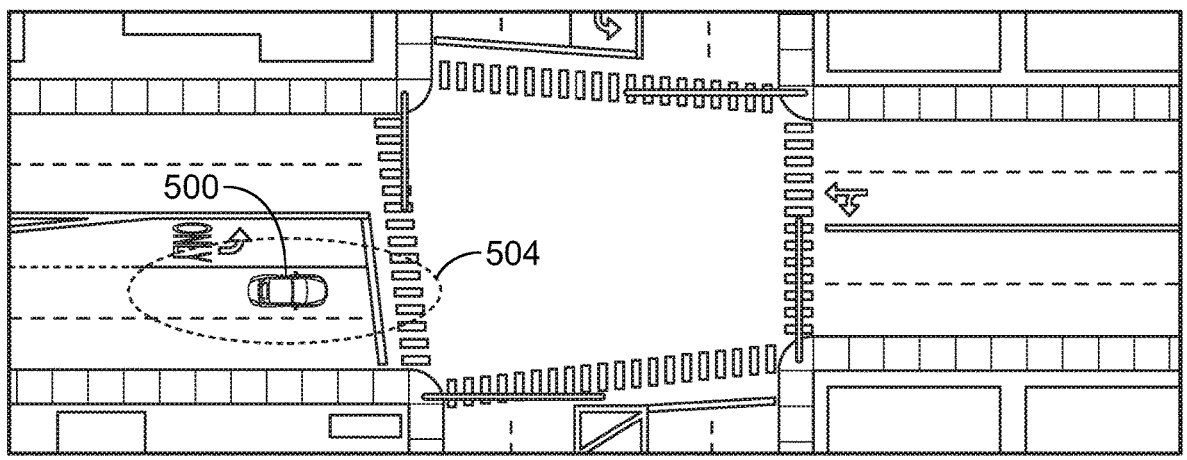
FIG. 5B shows a simplified diagram representing a top down view of the AV's surrounding environment at the same given point in time as in FIG. 5A as indicated by data that was modified by a fault-injection subsystem to include a perception fault.

In contrast, FIG. 5B shows a simplified diagram representing a top down view of the AV's surrounding environment at the given point in time as indicated by data that was modified by fault-injection subsystem 311 to include a perception fault. In particular, as shown, fault-injection subsystem 311 injected a perception fault by discarding data output by perception subsystem 302 corresponding to vehicle agents 501, 502, and 503 illustrated in FIG. 5A based on fault-injection subsystem 311 determining that (i) AV 500 was located proximate to an intersection location, (ii) perception subsystem 302 perceived one or more vehicle agents (e.g., vehicle agents 501, 502, and 503), and (iii) the perceived one or more vehicle agents were outside of a threshold distance 504 from AV 500.

Figure 5C:
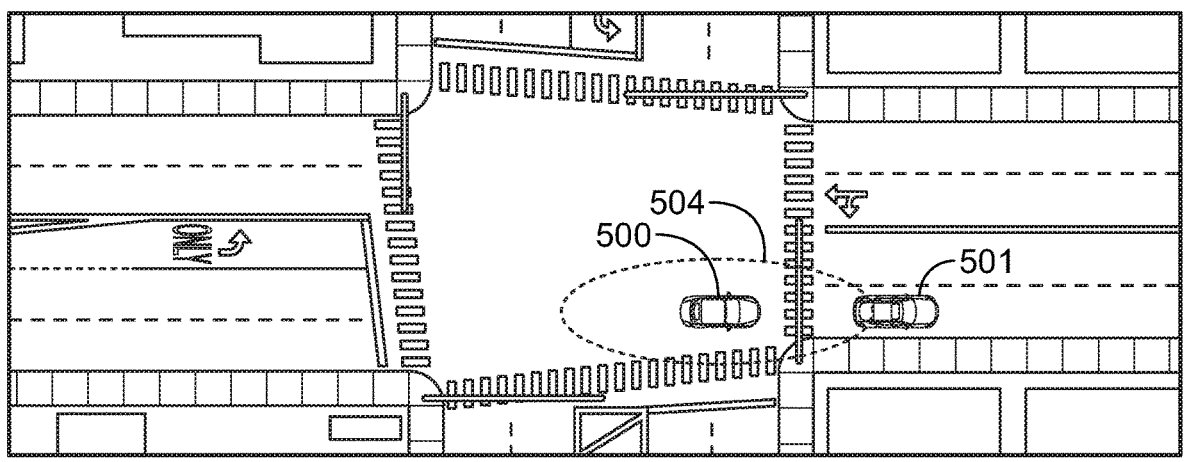
FIG. 5C shows a simplified diagram representing a top down view of the AV's surrounding environment, as indicated by data that was modified by the fault-injection subsystem to include a perception fault, after the point in time illustrated in FIG. 5B and the AV moving into proximity of a given agent in the environment.

As shown in FIG. 5C, because AV 500 has moved such that at least one of the perceived vehicle agents is within threshold distance 504 (e.g., vehicle agent 501), fault-injection subsystem 311 caused AV 500 to "see" that vehicle agent (e.g., vehicle agent 501) but continued to keep the AV 500 "blind" to vehicle agents outside of threshold distance 504 (e.g., vehicle agents 502 and 503 illustrated in FIG. 5A). In this way, fault-injection subsystem 311 facilitates testing how the AV's autonomy system (e.g., subsystems downstream of perception subsystem 302) and/or response mechanisms adapt to AV 500 suddenly beginning to perceive an agent that is in relatively close proximity to AV 500 (e.g., 5 meters) compared to an expected proximity at which AV 500 typically begins perceiving agents (e.g., 20 meters).

Various other examples of "blind" perception faults are also possible. For instance, instead of making perceived agents disappear and then reappear once within a threshold distance from an AV, fault-injection subsystem 311 may inject a "blind" fault by making a perceived agent disappear once the AV is within a threshold distance of the perceived agent.

As another example of a perception fault, fault-injection subsystem 311 may inject a perception fault that changes the perception subsystem's classification for a given perceived agent (e.g., a "misclassification" perception fault). For example, perception subsystem 302 may have classified a given perceived agent as being a pedestrian and fault-injection subsystem 311 may inject a misclassification fault by changing classification data for the given perceived agent to instead reflect a bicyclist classification. As another example, perception subsystem 302 may have classified a given perceived agent as being a "dynamic" object and fault-injection subsystem 311 may inject a misclassification fault by changing classification data for the given perceived agent to reflect a "static" object classification. Other examples of misclassification perception faults are also possible.

As yet another example of a perception fault, fault-injection subsystem 311 may inject a perception fault that adds one or more objects that perception subsystem 302 did not actually perceive in the AV's test environment. For example, fault-injection subsystem 311 may add data indicative of one or more "false" objects to the data that is output by perception subsystem 302. In this way, autonomy subsystems downstream of perception subsystem 302 may operate under the impression that one or more objects are present within the AV's test environment that are not actually there.

As another example of a perception fault, fault-injection subsystem 311 may inject a perception fault that changes a perceived location of the AV itself or a perceived agent in the test environment (e.g., a "mislocalization" perception fault). For example, fault-injection subsystem 311 may manipulate data indicative of the AV's position and/or a perceived agent's position within a map. Consequently, a mislocalization fault may cause autonomy subsystems downstream of perception subsystem 302 to believe that the AV's (or a perceived agent's) current location within a map differs from the AV's (or a perceived agent's) actual current location.

Other examples of perception faults and other manners of injecting such faults are also possible.

As a further possible type of fault, fault-injection subsystem 311 may inject a prediction fault, which may involve fault-injection subsystem 311 modifying the data output by prediction subsystem 303 such that input data for planning subsystem 304 includes a fault. As one particular example of a prediction fault, fault-injection subsystem 311 may inject a prediction fault that causes autonomy subsystems downstream of prediction subsystem 303 to perform autonomy functions based on a respective future behavior for at least one given agent that differs in at least one respect from the future behavior that was predicted by prediction subsystem 303 for that given agent (e.g., a "misprediction" fault). For instance, fault-injection subsystem 311 may modify one or more of the following attributes of the prediction subsystem's predicted behavior for a given agent: (i) a predicted position, (ii) a predicted orientation, (iii) a predicted velocity, (iv) a predicted acceleration, (v) a predicted heading, or (vi) a predicted movement state, among other possibilities. In this way, one or more autonomy subsystems downstream of prediction subsystem 303 may not operate based on the prediction subsystem's real prediction of this future behavior (e.g., planning subsystem 304 may act based on an understanding that an agent will be in motion when prediction system 303 predicted that the agent would be stopped). Other examples of prediction faults and other manners of injecting such faults are also possible.

Figure 6A:
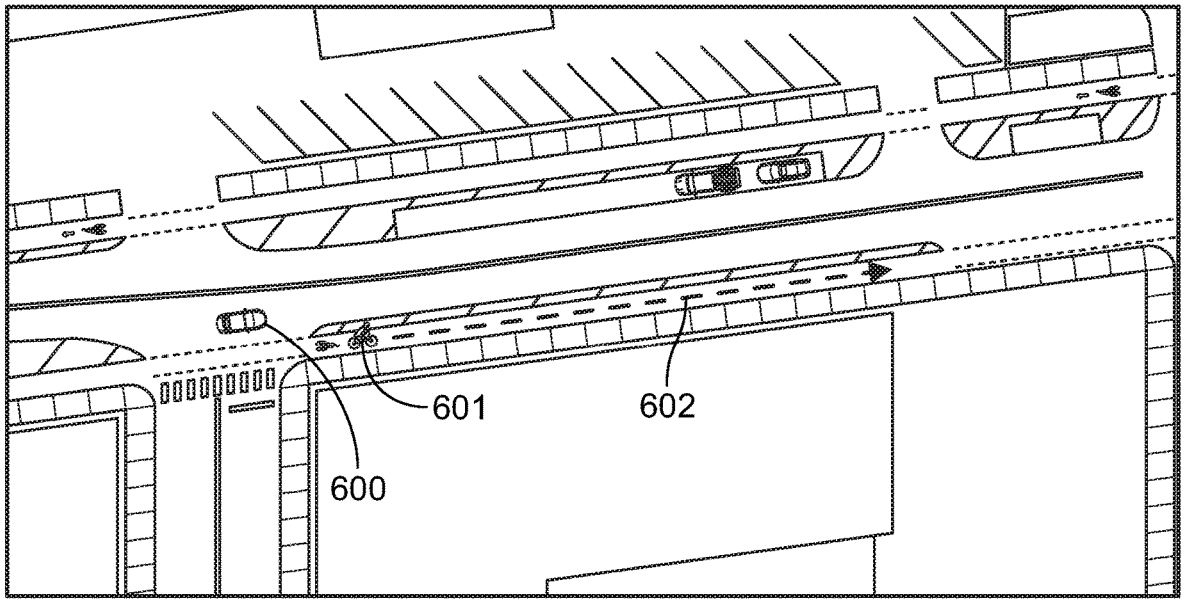
FIG. 6A shows a simplified diagram representing a top down view of an AV's surrounding environment at a given point in time along with a representation of a prediction for a given agent as indicated by data output from a prediction subsystem.

As one example to illustrate, FIG. 6A shows a simplified diagram representing a top down view of the AV's surrounding environment at a given point in time along with a representation of a predicted future behavior for a given agent as indicated by data output by prediction subsystem 303. In particular, as shown, perception subsystem 302 of AV 600 perceived an agent 601 that AV 600 classified as belonging to a bicyclist class, and prediction subsystem 303 of AV 600 predicted a future trajectory for bicyclist agent 601 as represented by predicted future trajectory line 602. In this example, prediction subsystem 303 predicted that bicyclist agent 601 would likely remain in a bicycle lane.

Figure 6B:
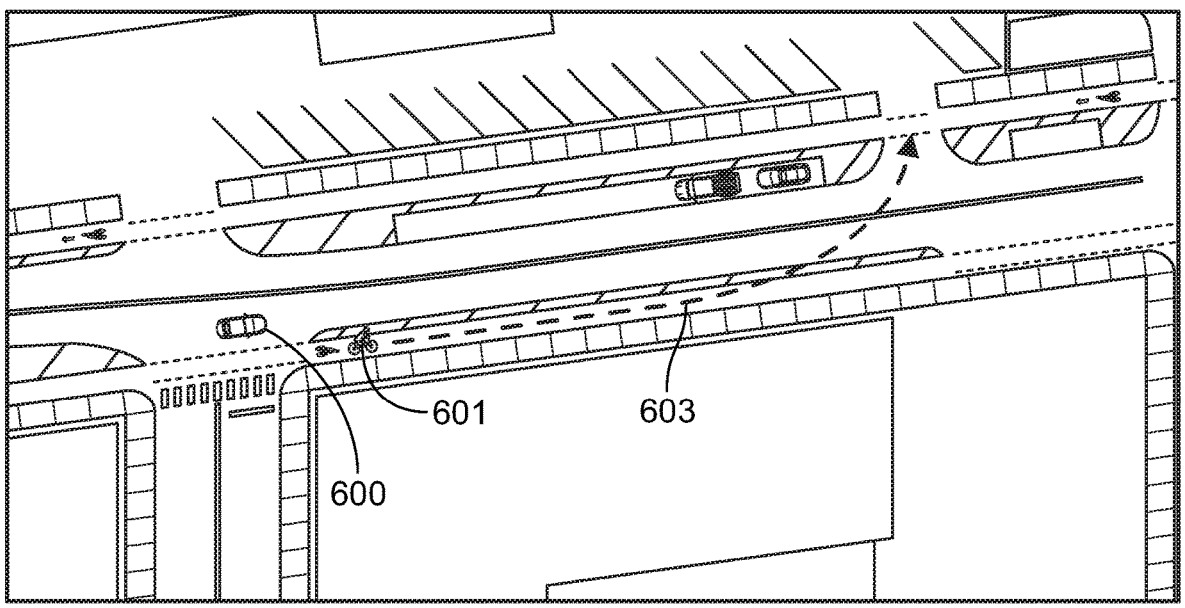
FIG. 6B shows a simplified diagram representing a top down view of the AV's surrounding environment at the same given point in time as in FIG. 6A along with a representation of a prediction for the given agent as indicated by data that was modified by a fault-injection subsystem to include a prediction fault.

On the other hand, FIG. 6B shows a simplified diagram representing a top down view of the AV's surrounding environment at the given point in time along with a representation of a behavior prediction as indicated by data that was modified by fault-injection subsystem 311 to include a prediction fault. In particular, as shown, fault-injection subsystem 311 injected a prediction fault by modifying data indicative of the predicted future trajectory for bicyclist object 601 such that bicyclist agent 601 is now predicted to cross in front of AV 600 as represented by modified, predicted future trajectory line 603. Fault-injection subsystem 311 may have injected this prediction fault based on determining that (i) AV 600 was traveling below a certain threshold velocity and (ii) bicyclist agent 601 was over a threshold distance away from AV 600.

Thus, despite prediction subsystem 303 predicting that bicyclist agent 601 would likely remain in the bicycle lane for the foreseeable future, fault-injection subsystem 311 injected a fault such that subsystems downstream of prediction subsystem 303 will believe that bicyclist agent 601 is likely to cross in front of AV 600 in the near future. In this way, fault-injection subsystem 311 facilitates testing how the AV's autonomy system (e.g., prediction subsystem 303 and/or planning subsystem 304) and/or response mechanisms adapt to the incorrect prediction when bicyclist agent 601 continues moving forward within the bike lane while AV 600 slowed down and/or stopped in preparation for bicyclist agent 601 to turn.

As yet another possible type of fault, fault-injection subsystem 311 may inject a planning fault, which may involve fault-injection subsystem 311 modifying the data output by planning subsystem 304 such that input data for control subsystem 305 includes a fault. As one particular example of a planning fault, fault-injection subsystem 311 may inject a planning fault that causes autonomy subsystems downstream of planning subsystem 304 to perform autonomy functions (and ultimately affect the AV's real-world operation) in accordance with a behavior plan that differs in at least one aspect from a behavior plan derived by planning subsystem 304. For instance, fault-injection subsystem 311 may modify aspects of a planned trajectory for the AV (e.g., by modifying one or more of the planned states included in the planned trajectory, such as by changing the AV's planned speed, planned acceleration, planned direction of travel, etc.) and/or may modify one or more deviation boundaries (e.g., by making a deviation range smaller such that smaller deviations from the behavior plan will cause the AV to disengage its autonomy system or by making a deviation range larger such that the AV will disengage its autonomy system after larger deviations from the behavior plan). Other examples of planning faults and other manners of injecting such faults are also possible.

Figure 7A:
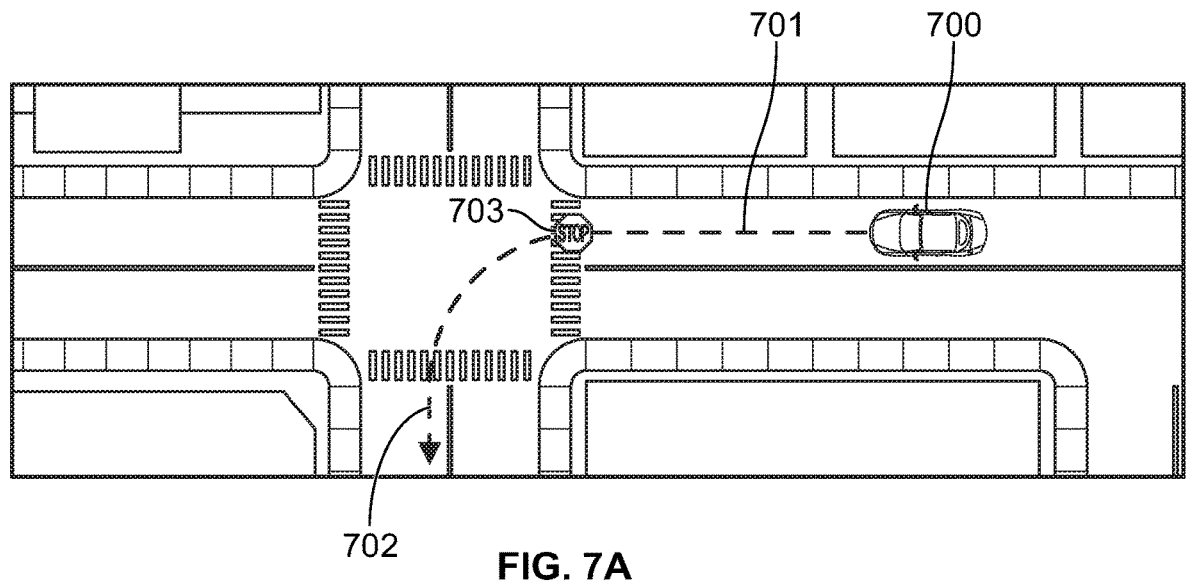
FIG. 7A shows a simplified diagram representing a top down view of an AV's surrounding environment at a given point in time along with a representation of a behavior plan for the AV as indicated by data output from a planning subsystem.

As one example to illustrate, FIG. 7A shows a simplified diagram representing a top down view of the AV's surrounding environment at a given point in time along with a representation of a behavior plan for the AV as indicated by data output by planning subsystem 304. As shown, the behavior plan for AV 700 includes a planned trajectory that defines a planned path represented by path arrows 701 and 702 as well as a planned stop represented by stop indicator 703 at a crosswalk.

Figure 7B:
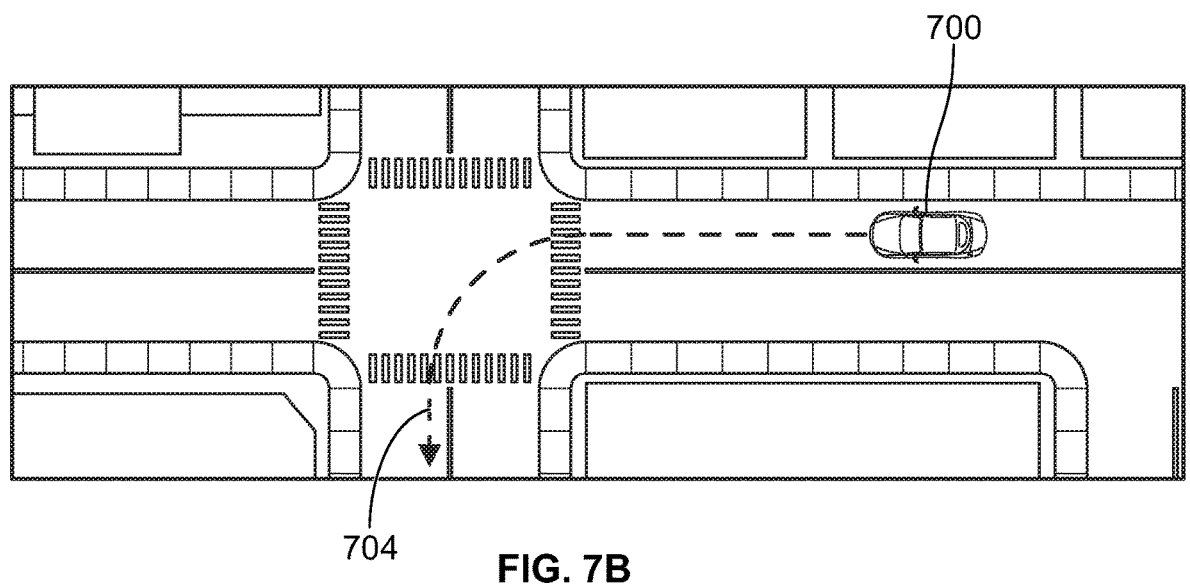
FIG. 7B shows a simplified diagram representing a top down view of the AV's surrounding environment at the same given point in time as in FIG. 7A along with a representation of a behavior plan for the AV as indicated by data that was modified by a fault-injection subsystem to include a planning fault.

In contrast, FIG. 7B shows a simplified diagram representing a top down view of the AV's surrounding environment at the given point in time along with a representation of a behavior plan for the AV as indicated by data that was modified by fault-injection subsystem 311 to include a planning fault. In particular, as shown, fault-injection subsystem 311 injected a planning fault by modifying data indicative of the planned trajectory such that AV 700 is no longer expected to stop at the crosswalk, as reflected by a single, continuous path arrow 704. Fault-injection subsystem 311 may have injected this planning fault based on determining that (i) AV 700 was within a threshold distance of a given geographical location and (ii) AV 700 had not perceived any pedestrian agents proximate to AV 700.

Accordingly, despite planning subsystem 304 generating a behavior plan specifying that AV 700 is to stop at the crosswalk, fault-injection subsystem 311 injected a fault such that subsystems downstream of planning subsystem 304 will execute a behavior plan for AV 700 that does not involve a stop at the crosswalk. Thus, fault-injection subsystem 311 facilitates testing how the AV's autonomy system (e.g., planning subsystem 304 and/or control subsystem 305) and/or response mechanisms adapt to AV 700 operating according to a behavior plan that differs from one provided by planning subsystem 304.

As a further possible type of fault, fault-injection subsystem 311 may inject a control fault, which may involve fault-injection subsystem 311 modifying data output by control subsystem 305 such that input data for vehicle interface 306 includes a fault. For example, fault-injection subsystem 311 may inject a control fault that causes vehicle interface 306 to output one or more control messages (e.g., one or more braking, throttle, or steering messages) that instruct the AV's actuators to control the physical operation of the AV in a manner that differs in at least some respect from how the actuators would have controlled the physical operation of the AV based on data output by control subsystem 305. For instance, fault-injection subsystem 311 may inject a control fault such that, instead of the AV autonomously driving continuously through an intersection, the AV will autonomously brake at the intersection. Another example injected control fault is illustrated in FIG. 1 and described above. Other examples of control faults and other manners of injecting such faults are also possible.

Fault-injection subsystem 311 may be configured to inject other types of faults, and in other manners, as well.

Thus, as discussed above, after fault-injection subsystem 311 injects at least one fault into autonomy system 310, autonomy system 310 may continue performing one or more autonomy functions despite being subjected to the at least one fault. Consequently, the AV will autonomously perform one or more driving operations in the test environment in accordance with an autonomy fault such that the AV operates in an unexpected manner for some amount of time.

Returning to FIG. 4, at block 406, fault-injection subsystem 311 (or some other component of the AV) may capture data indicative of a response by a response mechanism of the AV to the AV autonomously performing the operation in accordance with the at least one fault injected at block 405. In other words, response data may be captured that is indicative of a response mechanism detecting an unexpected AV behavior and correcting that behavior to bring the AV's operating behavior more in line with expected AV behavior.

For instance, as discussed before, to help limit the amount of time that the AV operates in an unexpected manner, the AV may include one or more response mechanisms that may take one or more corrective actions once a fault is detected. As one possibility, the AV may include one or more automated, on-board response systems (e.g., computer-based systems) that include hardware, software, or a combination thereof that are configured to detect and react to respective potential faults. As one particular example, an automated response system may take the form of one or more modules within a downstream subsystem of autonomy system 310 that redundantly perform one or more functions of an upstream subsystem of autonomy system 310 when a particular fault is detected. As another particular example, an automated response system may take the form of one or more feedback routines within autonomy system 310 that cause an upstream subsystem to re-perform its respective autonomy functions when a particular fault is detected downstream of that subsystem. Other examples of on-board, automated response systems are also possible.

As discussed before, another possible response mechanism is a human "safety driver" that is piloting the AV during a given test mission, and the safety driver may detect and react to unexpected AV behaviors. For instance, a control fault may be injected within autonomy system 310 causing the AV's steering system to unexpectedly start to change lanes upon passing a certain location and/or detecting a type of situation or object around the AV (or any other trigger condition), and the safety driver may detect this unexpected behavior and react by bringing the AV back into its expected road lane. Other types of response mechanisms are also possible.

Regardless of the type of response mechanism that is engaged, data indicative of that response mechanism's response to a given injected fault is captured by a subsystem of the AV. For instance, in some implementations, fault-injection subsystem 311 itself may capture response data. Additionally or alternatively, some other component of the AV may capture response data, such as a different subsystem of autonomy system 310 or perhaps a component of the AV that is dedicated to capturing such data. Other possibilities also exist.

In practice, response data may take different forms, such as data indicative of different types of response times. As one possibility, response data may be indicative of a reaction time, which may be an amount of time between a point in time when the AV was exposed to a given fault and a point in time when the response mechanism completed a corrective action for that given fault. As one particular example, a reaction time for a safety driver of an AV may be an amount of time between a point in time when the AV was exposed to a given fault and a point in time when the safety driver disengaged the AV's autonomy system.

As another possibility, response data may be indicative of a detection time, which may be an amount of time between a point in time when the AV was exposed to a given fault and a point in time when the response mechanism began taking a corrective action for that given fault. As one example, a detection time for an on-board response system may be an amount of time between a point in time when the AV was exposed to a given fault and a point in time when a redundant module or feedback routine was engaged to begin handling the given fault.

As yet another possibility, response data may be indicative of a resolution time, which may be an amount of time between a point in time when the AV began taking a corrective action for a given fault and a point in time when the response mechanism completed a corrective action for that given fault. For example, a resolution time for an on-board response system may be an amount of time between a point in time when a redundant module or feedback routine was first engaged in response to the AV being exposed to a given fault and a point in time when the redundant module or feedback routine completed any corrective action for the given fault.

Moreover, aside from the aforementioned examples of time-specific types of response data, other types of response data may be additionally or alternatively captured. For instance, data indicative of one or more characteristics of any responsive actions taken by the AV to correct for a given fault (e.g., a steering, braking, and/or throttle parameter value) may be captured.

Other examples of data indicative of a response mechanism's response to a given injected fault may also be captured.

As a first illustrative example, returning to FIGS. 5A-5C, an on-board response system of AV 500 may have been invoked after the perception fault was injected as illustrated in FIG. 5B. For instance, a feedback routine downstream of perception subsystem 302 may have detected the fault and caused perception subsystem 302 to re-perform one or more of its perception functions. In this example, response data that was captured may include (i) a first response time defined as an amount of time between when the perception fault was injected and a time that the feedback routine invoked perception subsystem 302 to re-perform its perception functions and (ii) a second response time defined as an amount of time between perception subsystem 302 being invoked again and a time that the remainder of the AV's autonomy system accounted for perceived agents 501, 502, and 503. Moreover, after the perception fault was injected as illustrated in FIG. 5C, a response time may have been captured measuring how long it took the AV's autonomy system to adapt to suddenly beginning to perceive vehicle agent 501. In this way, how AV 500 handles a misperceived agent in the AV's environment can be evaluated, which may facilitate further refining the AV's systems so that AV 500 can respond more effectively to misperceived agents in the future.

As a second illustrative example, returning to FIGS. 6A-6B, an on-board response system of AV 600 may have been invoked after the prediction fault was injected as illustrated in FIG. 6B. For instance, one or more redundant modules downstream of prediction subsystem 303 (e.g., within planning subsystem 304) may have detected the fault and performed one or more prediction functions. In this example, response data that was captured may include a response time defined as an amount of time between when the one or more redundant modules detected the fault and a time that the one or more redundant modules completed performing the one or more prediction functions. In this way, how AV 600 handles an incorrect prediction for a perceived agent can be evaluated, which may facilitate further refining the AV's systems so that AV 600 can respond more effectively to incorrect predictions in the future.

As a third illustrative example, returning to FIGS. 7A-7B, a response mechanism of AV 700 taking the form of the AV's safety driver may have been invoked after the planning fault was injected as illustrated in FIG. 7B. For instance, after the planning fault was injected such that AV 700 was no longer planning to autonomously stop at the crosswalk, the AV's safety driver may have detected that AV 700 was approaching the crosswalk but not slowing down and then reacted by disengaging the AV's autonomy system and manually applying the brakes. In this example, response data that was captured may include (i) a reaction time defined as an amount of time between when AV 700 was exposed to the planning fault and a time that the safety driver disengaged the AV's autonomy system and (ii) one or more characteristics of the safety driver's responsive actions, such as data providing a measure of how strongly the safety driver applied the brakes and data providing a measure of whether the safety driver applied any steering actions. In this way, the particular safety driver's response to a particular type of fault (e.g., a planning fault) under certain real-world variables can be measured to help evaluate the particular safety driver's skills and/or the effectiveness of the particular safety driver's training.

As noted above, data is captured that is indicative of a response by a response mechanism of the AV to the AV autonomously performing an operation in accordance with at least one injected fault. In practice, response data may be captured corresponding to several instances of context-based faults being injected during the same test mission and/or other test missions that the particular AV performs. Likewise, response data may be captured for numerous other AVs performing test missions in which respective fault-injection subsystems inject repeatable, context-based faults into those AVs' respective autonomy systems. Various functions may be performed based on such response data.

As one possibility, data analysis may be performed on response times and/or characteristics of any responsive actions captured in response to fault-injection subsystems of one or more AVs injecting one or more different types of faults during test missions. Various insights may be derived from such an analysis. For example, from this data analysis, accurate estimates of response times and/or characteristics of responsive actions may be derived on a fault-by-fault basis generally and/or in specific scenarios that involve different contextual factors. Likewise, this information can be analyzed according to other variables as well, such as the type of AV, version of machine-learning models running on the AV, AV sensor configurations, etc. In any case, autonomy systems and/or response mechanisms can then be validated and/or fine-tuned based on this information.

As another possibility, data analysis may be performed on reaction times and/or behaviors corresponding to safety drivers that are considered to be "safe" or "unsafe" drivers. Various insights may be derived from such an analysis. For example, safety-driver insights can be derived that help facilitate identifying safety drivers that are excelling and/or underachieving (and thus, may pose a safety risk). In this respect, a range of reaction times that are considered to be acceptable may be derived that can serve as a basis for when a given safety-driver is deemed qualified to operate AVs on public roads. As another example, information can be derived that helps to evaluate the effectiveness of safety-driver training programs and/or improve or otherwise refine such programs.

Response data from test missions involving fault-injection subsystems injecting repeatable, context-based faults into AVs operating in test environments under various conditions may be used for other purposes as well.

Notably, in practice, the fault-injection subsystem described herein may be designed with one or more security mechanisms. For instance, as discussed before, a fault-injection subsystem may be designed such that only authorized users can install this subsystem into an AV's autonomy system and/or only authorized users (e.g., authorized safety drivers or engineers) can utilize its functionality during test missions. Moreover, a fault-injection subsystem may be designed such that the program instructions that carry out the fault-injection functions described herein are stored within the fault-injection subsystem itself in an isolated manner. Further yet, a fault-injection subsystem may implement one or more encryption techniques that enable secure data exchanges between autonomy pipeline subsystems and the fault-injection subsystem (e.g., a PKI technique or the like). Other security mechanisms may additionally or alternatively be used as well.

Turning now to FIG. 8, a simplified block diagram of certain systems that may be included in an example AV 800 are illustrated. As shown, at a high level, AV 800 may include at least a (i) sensor system 801 that is configured capture sensor data that is representative of the environment being perceived by the AV (e.g., the AV's surrounding real-world environment) and/or the AV's operation within that environment, (ii) an on-board computing system 802 that is configured to perform functions related to autonomous operation of AV 800 (and perhaps other functions as well), (iii) a vehicle-control system 803 that is configured to control the physical operation of AV 800, and (iv) on-board response system that is configured to detect and react to faults, among other possibilities. These systems may be communicatively linked to one another via a system bus, communication network, or some other connection mechanism, and each of these AV systems may take various forms.

In general, sensor system 801 (which may correspond to sensor subsystem 301 of autonomy system 300 or 310) may comprise any of various types of sensors, each of which is generally configured to detect one or more particular stimuli based on AV 800 operating in an environment (e.g., a real-world environment) and then output sensor data that is indicative of one or more measured values of the one or more stimuli at one or more capture times (which may each comprise a single instant of time or a range of times).

For instance, as one possibility, sensor system 801 may include one or more two-dimensional (2D) sensors that are each configured to capture 2D data that is representative of the AV's surrounding environment. Examples of 2D sensor(s) may include a 2D camera array, a 2D Radio Detection and Ranging (RADAR) unit, a 2D Sound Navigation and Ranging (SONAR) unit, a 2D ultrasound unit, a 2D scanner, and/or 2D sensors equipped with visible-light and/or infrared sensing capabilities, among other possibilities. Further, in an example implementation, 2D sensor(s) may comprise an arrangement that is capable of capturing 2D sensor data representing a 360° view of the AV's surrounding environment, one example of which may take the form of an array of 6-7 cameras that each have a different capture angle. Other 2D sensor arrangements are also possible.

As another possibility, sensor system 801 may include one or more three-dimensional (3D) sensors that are each configured to capture 3D data that is representative of the AV's surrounding environment. Examples of 3D sensor(s) may include a Light Detection and Ranging (LIDAR) unit, a 3D RADAR unit, a 3D SONAR unit, a 3D ultrasound unit, and a camera array equipped for stereo vision, among other possibilities. Further, in an example implementation, 3D sensor(s) may comprise an arrangement that is capable of capturing 3D sensor data representing a 360° view of the AV's surrounding environment, one example of which may take the form of a LIDAR unit that is configured to rotate 360° around its installation axis. Other 3D sensor arrangements are also possible.

As yet another possibility, sensor system 801 may include one or more state sensors that are each configured to detect aspects of the AV's current state, such as the AV's current position, current orientation (e.g., heading/yaw, pitch, and/or roll), current velocity, and/or current acceleration. Examples of state sensor(s) may include an Inertial Measurement Unit (IMU) (which may be comprised of accelerometers, gyroscopes, and/or magnetometers), an Inertial Navigation System (INS), a Global Navigation Satellite System (GNSS) unit such as a Global Positioning System (GPS) unit, among other possibilities.

Sensor system 801 may include various other types of sensors as well, such as sensors that capture data indicative of environmental conditions (e.g., presence or absence of rain, lighting conditions, etc.).

In turn, on-board computing system 802 may generally comprise any computing system that includes at least a communication interface 821, at least one processor 822, and data storage 823, where such components may either be part of a single physical computing device or be distributed across a plurality of physical computing devices that are interconnected together via a communication link. Each of these components may take various forms.

For instance, communication interface 821 may take the form of any one or more interfaces that facilitate communication with other systems of AV 800 (e.g., sensor system 801, vehicle-control system 803, etc.) and/or remote computing systems (e.g., a backend platform), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, processor 822 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, data storage 823 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.). In this respect, data storage 823 may be configured to store both (i) software that takes the form of program instructions that are executable by processor 822 such that on-board computing system 802 is configured to perform various functions related to the autonomous operation of AV 800 (and perhaps other functions as well), and (ii) data that may be received, derived, or otherwise obtained by on-board computing system 802.

In example embodiments, as discussed above, on-board computing system 802 may also be functionally configured into a number of different subsystems that are each tasked with performing a specific subset of functions that facilitate the autonomous operation of AV 800, and these subsystems may be collectively referred to as the AV's "autonomy system."

As mentioned above, the autonomy system of AV 800 is configured to output control signals to certain control components of vehicle-control system 803 to control the physical operation of AV 800. For instance, vehicle-control system 803 may include a plurality of actuators that are each configured to control a respective aspect of the AV's physical operation, such as a throttle actuator that is configured to control the vehicle's throttle, a steering actuator that is configured to control the vehicle components responsible for steering, and a braking actuator that is configured to control the vehicle components responsible for braking, among other possibilities. However, it should be understood that the control components of vehicle-control system 803 may take various other forms as well.

As suggested above, AV 800 may include one or more computer-based response systems 804, each of which comprises hardware, software, or a combination thereof that are configured to automatically detect and react to one or more particular types of faults. In practice, a given response system 804 may comprise a system, one or more subsystems, one or more modules, and/or one or more feedback routines that are distinct from the other systems or subsystems of AV 800 or that are partially or wholly integrated within one or more other systems or subsystems of AV 800. For example, one or more response system 804 may be partially or wholly integrated within the AV's autonomy system. Other possibilities also exist.

Although not specifically shown, it should be understood that AV 800 includes various other systems and components as well, including but not limited to a propulsion system that is responsible for creating the force that leads to the physical movement of AV 800.

A person of ordinary skill in the art will appreciate that FIG. 8 is but one example, simplified arrangement of certain components of an AV and that numerous other arrangements are also possible and contemplated herein. For example, AVs may include additional components not illustrated in FIG. 8 and/or more or fewer of the illustrated components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "safety drivers," "operators," "users" or other entities, this is for purposes of example and explanation only. The claims should not be construed as requiring action by such actors unless explicitly recited in the claim language.

The invention claimed is:

1. A computer-implemented method comprising:
obtaining data for one or more data variables related to autonomous operation of a vehicle in a test environment being facilitated by an autonomy system of the vehicle;
based on the data, evaluating of a set of predefined fault rules, wherein each of the predefined fault rules comprises (i) a set of predefined criteria related to the one or more data variables and (ii) a predefined fault that is to be injected into the autonomy system of the vehicle when the set of predefined criteria are determined to be satisfied, and wherein the predefined fault includes at least one of: a planning fault and a control fault,
wherein the set of predefined criteria comprises at least one (i) temporal criterion, (ii) ambient-condition criterion, and (iii) operator criterion, and wherein the predefined criteria are satisfied when a) an operator of the vehicle is associated with at least one of a required experience level and a fault history for the operator criterion, b) the vehicle is on a test mission at a pre-determined time for the temporal criterion, and c) at least one of a weather condition, a lighting condition, and a presence of an object is present in surroundings of the vehicle for the ambient-condition criterion;
in response to evaluating the set of predefined fault rules, injecting the predefined fault into the autonomy system of the vehicle; and
capturing data indicative of a response by a response mechanism of the vehicle to the vehicle autonomously operating in accordance with the predefined fault.

2. The computer-implemented method of claim 1, wherein obtaining data for the one or more data variables related to autonomous operation of the vehicle comprises obtaining, from one or more sensors of the vehicle while the vehicle is operating in the test environment, sensor data related to the autonomous operation of the vehicle within the test environment.

3. The computer-implemented method of claim 1, wherein the autonomy system comprises one or more of (i) a sensor subsystem, (ii) a perception subsystem, (iii) a prediction subsystem, (iv) a planning subsystem, or (v) a control subsystem.

4. The computer-implemented method of claim 3, wherein the autonomy system further comprises a vehicle interface subsystem, and wherein injecting the predefined fault into the autonomy system of the vehicle comprises injecting at least one of (i) the planning fault into data that is input into the control subsystem, wherein the planning fault is associated with a planned trajectory of the vehicle and (ii) the control fault into data that is input into the vehicle interface subsystem, wherein the control fault is associated with an actuation of at least one physical component of the vehicle.

5. The computer-implemented method of claim 1, wherein the autonomy system uses sensor data to generate derived data that facilitates autonomous operation of the vehicle in the test environment, wherein the derived data is generated by the autonomy system according to the sensor data, and wherein injecting the predefined fault into the autonomy system of the vehicle comprises:
modifying the derived data such that at least one aspect of the derived data differs from the derived data that was originally generated by the autonomy system of the vehicle; and
causing the vehicle to autonomously operate in accordance with the derived data.

6. The computer-implemented method of claim 5, wherein modifying the derived data such that at least one aspect of the derived data differs from the derived data that was originally generated by the autonomy system of the vehicle comprises:

modifying at least one of (i) derived data generated by the autonomy system of the vehicle that is indicative of a perception of the vehicle of the test environment, (ii) derived data generated by the autonomy system of the vehicle that is indicative of a predicted future behavior of one or more objects perceived by the vehicle in the test environment, (iii) derived data generated by the autonomy system of the vehicle that defines a plan for the autonomous operation of the vehicle in the future, or (iv) derived data generated by the autonomy system of the vehicle that defines instructions for executing the plan.

7. The computer-implemented method of claim 1, wherein capturing data indicative of a response by a response mechanism of the vehicle comprises capturing data indicative of a response by a computer-based response mechanism of the vehicle to the vehicle autonomously operating in accordance with the at least one injected fault.

8. A non-transitory computer-readable medium comprising program instructions stored thereon that are executable by at least one processor such that a computing system is configured to:
   obtain data for one or more data variables related to autonomous operation of a vehicle in a test environment being facilitated by an autonomy system of the vehicle;
   based on the data, evaluate a set of predefined fault rules, wherein each of the predefined fault rules comprises (i) a set of predefined criteria related to the one or more data variables and (ii) a predefined fault that is to be injected into the autonomy system of the vehicle when the set of predefined criteria are determined to be satisfied,
      wherein the predefined fault includes at least one of: a planning fault and a control fault,
   wherein the set of predefined criteria comprises at least one (i) temporal criterion, (ii) ambient-condition criterion, and (iii) operator criterion, and wherein the predefined criteria are satisfied when a) an operator of the vehicle is associated with at least one of a required experience level and a fault history for the operator criterion, b) the vehicle is on a test mission at a pre-determined time for the temporal criterion, and c) at least one of a weather condition, a lighting condition, and a presence of an object is present in surroundings of the vehicle for the ambient-condition criterion;
   responsive to evaluating the set of predefined fault rules, inject the predefined fault into the autonomy system of the vehicle; and
   capture data indicative of a response by a response mechanism of the vehicle to the vehicle autonomously operating in accordance with the predefined fault.

9. The non-transitory computer-readable medium of claim 8, wherein the program instructions comprise program instructions to:
   obtain, from one or more sensors of the vehicle while the vehicle is operating in the test environment, sensor data related to autonomous operation of the vehicle within the test environment.

10. The non-transitory computer-readable medium of claim 8, wherein the autonomy system comprises one or more of (i) a sensor subsystem, (ii) a perception subsystem, (iii) a prediction subsystem, (iv) a planning subsystem, or (v) a control subsystem.

11. The non-transitory computer-readable medium of claim 10, wherein the autonomy system further comprises a vehicle interface subsystem, and wherein the program instructions comprise program instructions to:
   inject at least one of (i) the planning fault into data that is input into the control subsystem, wherein the planning fault is associated with a planned trajectory of the vehicle, and (ii) the control fault into data that is input into the vehicle interface subsystem, wherein the control fault is associated with an actuation of at least one physical component of the vehicle.

12. The non-transitory computer-readable medium of claim 8, wherein the autonomy system uses sensor data to generate derived data that facilitates autonomous operation of the vehicle in the test environment, wherein the derived data is generated by the autonomy system according to the sensor data, and wherein the program instructions comprise program instructions to:
   modify the derived data such that at least one aspect of the derived data differs from the derived data that was originally generated by the autonomy system of the vehicle; and
   cause the vehicle to autonomously operate in accordance with the derived data.

13. The non-transitory computer-readable medium of claim 12, wherein the program instructions comprise program instructions to:
   modify at least one of (i) the derived data generated by the autonomy system of the vehicle that is indicative of a perception of the vehicle of the test environment, (ii) the derived data generated by the autonomy system of the vehicle that is indicative of a predicted future behavior of one or more objects perceived by the vehicle in the test environment, (iii) the derived data generated by the autonomy system of the vehicle that defines a plan for the autonomous operation of the vehicle in the future, or (iv) the derived data generated by the autonomy system of the vehicle that defines instructions for executing the plan.

14. The computer-readable medium of claim 8, wherein the program instructions comprise program instructions to:
   capture data indicative of a response by a computer-based response mechanism of the vehicle to the vehicle autonomously operating in accordance with the at least one injected fault.

15. A computing system comprising:
   at least one processor;
   a non-transitory computer-readable medium; and
   program instructions stored on the non-transitory computer-readable medium that are executable by the at least one processor such that the computing system is configured to:
      obtain data for one or more data variables related to autonomous operation of a vehicle in a test environment being facilitated by an autonomy system of the vehicle;
      based on the data, evaluate of a set of predefined fault rules, wherein each of the predefined fault rules comprises (i) a set of predefined criteria related to the one or more data variables and (ii) a predefined fault that is to be injected into the autonomy system of the vehicle when the set of predefined criteria are determined to be satisfied,
         wherein the predefined fault includes at least one of: a planning fault and a control fault,
      wherein the set of predefined criteria comprises at least one a) temporal criterion, (ii) ambient-condition criterion, and (iii) operator criterion, and wherein the predefined criteria are satisfied when a) an operator of the vehicle is associated with at least one of a required experience level and a fault history for the operator criterion, b) the vehicle is on a test mission at a pre-determined time for the temporal criterion, and c) at least one of a weather condition, a lighting condition, and a presence of an object is present in surroundings of the vehicle for the ambient-condition criterion;

responsive to evaluating the set of predefined fault rules, inject the predefined fault into the autonomy system of the vehicle; and capture data indicative of a response by a response mechanism of the vehicle to the vehicle autonomously operating in accordance with the predefined fault.

16. The computing system of claim 15, wherein the autonomy system of the vehicle further comprises at least one of a control subsystem and a vehicle interface subsystem, and wherein derived data is generated by the autonomy system according to sensor data, and wherein the program instructions comprise program instructions to:

inject at least one of: (i) the planning fault into data that is input into a control subsystem, wherein the planning fault is associated with a planned trajectory of the vehicle and (ii) the control fault into data that is input into the vehicle interface subsystem, wherein the control fault is associated with an actuation of at least one physical component of the vehicle;

modify the derived data such that at least one aspect of the derived data differs from the derived data that was originally generated by the autonomy system of the vehicle; and cause the vehicle to autonomously operate in accordance with the derived data.

17. The computing system of claim 16, wherein the program instructions comprise program instructions to:

modify at least one of (i) derived data generated by the autonomy system of the vehicle that is indicative of a perception of the vehicle of the test environment, (ii) derived data generated by the autonomy system of the vehicle that is indicative of a predicted future behavior of one or more objects perceived by the vehicle in the test environment, (iii) derived data generated by the autonomy system of the vehicle that defines a plan for autonomous operation of the vehicle in the future, or (iv) derived data generated by the autonomy system of the vehicle that defines instructions for executing the plan.

18. The computing system of claim 15, wherein the program instructions that are executable by the at least one processor such that the computing system is configured to capture data indicative of a response by a response mechanism of the vehicle comprise program instructions that are executable by the at least one processor such that the computing system is configured to:

capture data indicative of a response by a computer-based response mechanism of the vehicle to the vehicle autonomously operating in accordance with the at least one injected fault.

* * * * *